United States Patent
Koshobu

(10) Patent No.: US 8,344,678 B2
(45) Date of Patent: Jan. 1, 2013

(54) SERVOMOTOR CONTROL SYSTEM AND SERVOMOTOR UNIT

(75) Inventor: Nobuaki Koshobu, Kariya (JP)

(73) Assignee: Denso Corporation, Kariya (JP)

( * ) Notice: Subject to any disclaimer, the term of this patent is extended or adjusted under 35 U.S.C. 154(b) by 329 days.

(21) Appl. No.: 12/803,287

(22) Filed: Jun. 23, 2010

(65) Prior Publication Data

US 2010/0327796 A1    Dec. 30, 2010

(30) Foreign Application Priority Data

Jun. 24, 2009 (JP) ................................. 2009-149838
Jun. 23, 2010 (JP) ................................. 2010-142505

(51) Int. Cl.
*G05B 11/32* (2006.01)

(52) U.S. Cl. ........ 318/625; 318/560; 318/468; 318/369; 318/268; 340/648

(58) Field of Classification Search .................. 318/625, 318/560, 468, 369, 268; 340/648
See application file for complete search history.

(56) References Cited

U.S. PATENT DOCUMENTS

| | | | |
|---|---|---|---|
| 5,803,355 A | 9/1998 | Ureshino et al. | |
| 6,397,609 B1 * | 6/2002 | Shikata et al. | 62/179 |
| 6,917,178 B2 * | 7/2005 | Takeuchi et al. | 318/625 |
| 7,005,821 B2 * | 2/2006 | Sunaga et al. | 318/594 |
| 7,038,421 B2 * | 5/2006 | Trifilo | 318/625 |
| 2004/0124797 A1 | 7/2004 | Takeuchi et al. | |
| 2007/0040529 A1 * | 2/2007 | Takebayashi et al. | 318/685 |

FOREIGN PATENT DOCUMENTS

| | | |
|---|---|---|
| JP | 62-138908 | 6/1987 |
| JP | 06-225563 | 8/1994 |
| JP | 07-35995 | 2/1995 |
| JP | 10-114058 | 5/1998 |
| JP | 2000-347742 | 12/2000 |
| JP | 2004-215488 | 7/2004 |
| JP | 2004-2154888 | 7/2004 |
| JP | 2004-276793 | 10/2004 |
| JP | 2006-280153 | 10/2006 |

OTHER PUBLICATIONS

Office Action dated Mar. 28, 2012 in corresponding Japanese Application No. 2010-142505 with English translation.
Office action dated Apr. 12, 2011 in corresponding Japanese Application No. 2010-142505.

* cited by examiner

*Primary Examiner* — Rita Leykin
(74) *Attorney, Agent, or Firm* — Harness, Dickey & Pierce, PLC

(57) ABSTRACT

A servomotor control system includes: an integrated control unit for integrally controlling servomotors; and servomotor units coupled with the integrated control unit and the servomotors. Each servomotor unit includes: a motor driver; a rotation detector of the servomotor; an original point detector for detecting an original point of the servomotor; a communication element for obtaining control information including rotation position instruction information from the integrated control unit; a rotation position calculator for calculating a current rotation position of the servomotor based on a rotation detection signal; a motor drive instruction element for outputting driving instruction information to the motor driver according to the control information and the current rotation position; and a current rotation position correction element for resetting the current rotation position to a predetermined original point when the original point detector detects the original point.

10 Claims, 20 Drawing Sheets

| Q11 | Q12 | Q21 | Q22 | RSET | COUNT VALUE |
|---|---|---|---|---|---|
| H | L | H | L | H | 100H |
| H | H | L | H | | +1 |
| H | L | H | H | | +1 |
| L | H | L | L | | +1 |
| L | L | H | L | | +1 |
| H | H | H | L | L | −1 |
| H | L | L | L | | −1 |
| L | H | H | H | | −1 |
| L | L | L | H | | −1 |
| OTHERS | | | | | NC |

FIG. 4

| Q11 | Q12 | Q21 | Q22 | RSET | COUNT VALUE |
|-----|-----|-----|-----|------|-------------|
| H | L | H | L | H | 100H |
| H | H | L | H |  | +1 |
| H | L | H | H |  | +1 |
| L | H | L | L |  | +1 |
| L | L | H | L |  | +1 |
| H | H | H | L | L | −1 |
| H | L | L | L |  | −1 |
| L | H | H | H |  | −1 |
| L | L | L | H |  | −1 |
| OTHERS | | | | | NC |

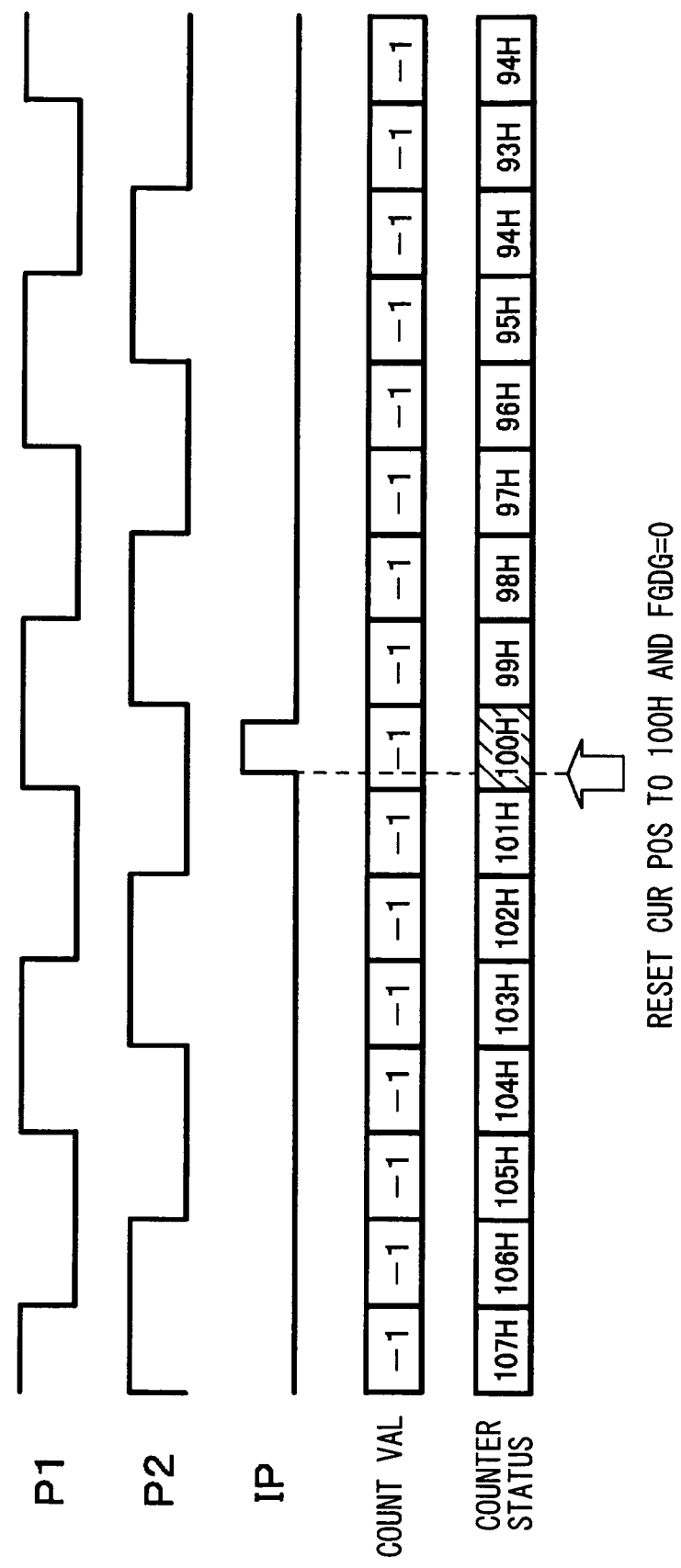

SERVOMOTOR CONTROL SYSTEM AND SERVOMOTOR UNIT

CROSS REFERENCE TO RELATED APPLICATIONS

This application is based on Japanese Patent Applications No. 2009-149838 filed on Jun. 24, 2009, and No. 2010-142505 filed Jun. 23, 2010, the disclosures of which are incorporated herein by reference.

FIELD OF THE INVENTION

The present invention relates to a servomotor control system and a servomotor unit.

BACKGROUND OF THE INVENTION

For example, an air-mix damper and a mode switching damper in an in-vehicle air conditioning device are controlled by multiple servomotors. Each servomotor is integrally controlled by an electronic control unit (ECU) in the air conditioning device. Specifically, an operating position of the damper is controlled by the multiple servomotors. To perform operating position control, it is necessary to detect a current rotation position of the motor.

For example, in U.S. Pat. No. 5,803,355 corresponding to JP-B2-3601888, a potentiometer is used for detecting the current rotation position. The potentiometer detects an absolute value of the current rotation position with using a resistor. However, the resistance of the resistor may deviate from a linear relationship of resistance change, and/or may depend on temperature. Thus, detection accuracy of the position may be low. Recently, a pulse encoder for detecting an angle in a digital manner is used as a rotation detection device with comparatively high detection accuracy. The manufacturing cost of the pulse encoder is comparatively low. An absolute type pulse encoder detects the absolute value of the rotation angle position. In this case, each data of the absolute angle position is defined by multiple bits. However, when the encoder has high resolution, it is necessary to prepare a combination of a slit series array corresponding to the number of bits of the angle position and an optical detection system. Thus, the manufacturing cost of the device is high, and therefore, it is not preferable to apply the high resolution pulse encoder to a vehicle and the like.

In such an industrial field, a rotation detector having a combination of an increment type pulse encoder and a counter is suitably used. In this case, although the rotation pulse does not represent the absolute position, the counter calculates to add or subtract the rotation pulse so that the rotation detector detects the current angle position based on the calculated rotation pulse. Thus, it is necessary to detect an original point for providing a reference value. For example, in case of a dual directional motor, the rotation detector includes a two-row type pulse generation slit having a phase difference. The rotation detector includes a two-phase difference pulse encoder is applied to the motor. The encoder determines an advance angle relationship of a phase in a pulse waveform for detecting an angle corresponding to each slit so that the encoder detects the rotation direction. However, even when the two-phase difference pulse encoder is used, it is difficult to detect the original point with using only the pulse encoder. However, in US Patent Application Publication No. 2004/0124797 corresponding to JP-A-2004-215488, a device detects the original point with setting a special pattern of the original point.

In case of an air conditioning system for a vehicle, the number of servomotors increases according to increasingly complex control. To control multiple servomotors, a controller is assembled in each motor so that a servomotor unit is formed. Further, multiple servomotor units are connected to an integrated control unit via a communication network so that each servomotor unit is controlled independently by the integrated control unit. In such a system, when the system starts to operate after the system is energized, or when the system loses information about the current rotation position because of some reasons, the integrated control unit sends an instruction to detect the original point so that the current rotation position of the servomotor is determined. This instruction is defined as an initialization control instruction.

In the initialization control process, a certain rotation direction is tentatively determined such that the original point exists toward the certain rotation direction. The integrated control unit sends a communication instruction to each servomotor unit. The communication instruction provides to execute an initialization operation for detecting the original point and a tentative target position in the rotation direction. The servomotor unit starts to operate the motor, and the unit stops operating the motor when a pattern showing the original point is received from the pulse encoder. When the integrated control unit receives a stop signal of the motor from the servomotor unit, the integrated control unit sends information of the correct current rotation position showing the original point to the servomotor unit. Then, the servomotor unit receives the information, and stores the information in a memory. Thus, since the servomotor control circuit recognizes the correct current rotation position, the control circuit can control the motor to move toward the target position accurately according to the information of the target position transmitted from the integrated control unit.

However, in a conventional system, the integrated control unit absolutely determines a control instruction including a target position instruction for each servomotor unit. Thus, it is necessary for each servomotor unit to receive the information about the correct current rotation position showing the original point from the integrated control unit in each time even when the initialization process is performed. Thus, each servomotor unit does not have a means for autonomously obtaining the correct current rotation position information. The following difficulties may arise. When the original point is detected, and the servomotor stops, the integrated control unit transmits the correct current rotation position data of the original point to the servomotor unit, and then, the data is stored in the servomotor unit. However, in this case, time delay for communication occurs inevitably. If the motor position is displaced by external force or the like during the dead time as a waiting time, wrong current rotation position information may be stored in the servomotor unit. Further, since the current rotation position is not corrected during a normal operation, the rotation position may be varied from the correct position if the counter for counting the number of pulses from the encoder mistakes the counting because of a noise or the like.

SUMMARY OF THE INVENTION

In view of the above-described problem, it is an object of the present disclosure to provide a servomotor control system and a servomotor unit. In the servomotor control system for controlling a servomotor according to a communication instruction from an integrated control unit, when an original position of the motor is corrected, influence of a rotation position shift of the motor during a communication dead time is improved.

According to a first aspect of the present disclosure, a servomotor control system includes: an integrated control unit for integrally controlling a plurality of servomotors; and a plurality of servomotor units, each of which is coupled with the integrated control unit via a communication network, and coupled with a corresponding servomotor. Each servomotor unit includes: a motor driver for driving the servomotor; a rotation detector for detecting rotation of the servomotor; an original point detector for detecting an original point of the servomotor; a communication element for obtaining control information including rotation position instruction information from the integrated control unit; a rotation position calculator for obtaining a rotation detection signal from the rotation detector and for calculating a current rotation position of the servomotor based on the rotation detection signal; a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point when the original point detector detects the original point.

In the above servomotor control system, the servomotor unit executes all of correction processes from an original point detection step to a current rotation position resetting process. Accordingly, even if the motor position is displaced by external force or the like during the dead time as a waiting time, the current rotation position is correctly reset since the system does not have the dead time. Further, since it is not necessary to obtain the correct current rotation position information from the integrated control unit, a communication sequence for motor control is simplified.

According to a second aspect of the present disclosure, a servomotor unit connectable to a communication network includes: a motor driver for driving a servomotor; a rotation detector for detecting rotation of the servomotor; an original point detector for detecting an original point of the servomotor; a communication element for obtaining control information including rotation position instruction information from an external integrated control unit via the communication network; a rotation position calculator for obtaining a rotation detection signal from the rotation detector and for calculating a current rotation position of the servomotor based on the rotation detection signal; a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point when the original point detector detects the original point.

In the above servomotor unit, the servomotor unit executes all of correction processes from an original point detection step to a current rotation position resetting process. Accordingly, even if the motor position is displaced by external force or the like during the dead time as a waiting time, the current rotation position is correctly reset since the system does not have the dead time. Further, since it is not necessary to obtain the correct current rotation position information from the integrated control unit, a communication sequence for motor control is simplified.

BRIEF DESCRIPTION OF THE DRAWINGS

The above and other objects, features and advantages of the present invention will become more apparent from the following detailed description made with reference to the accompanying drawings. In the drawings:

FIG. 4 is a diagram showing an operation logic table of an up-down counter in the pulse counter circuit;

FIG. 20 is a timing chart showing operation in the normal mode of the servomotor unit with passing through the original point and without the rotation position shift in case of reverse rotation.

DETAILED DESCRIPTION OF THE PREFERRED EMBODIMENTS

Figure 1:
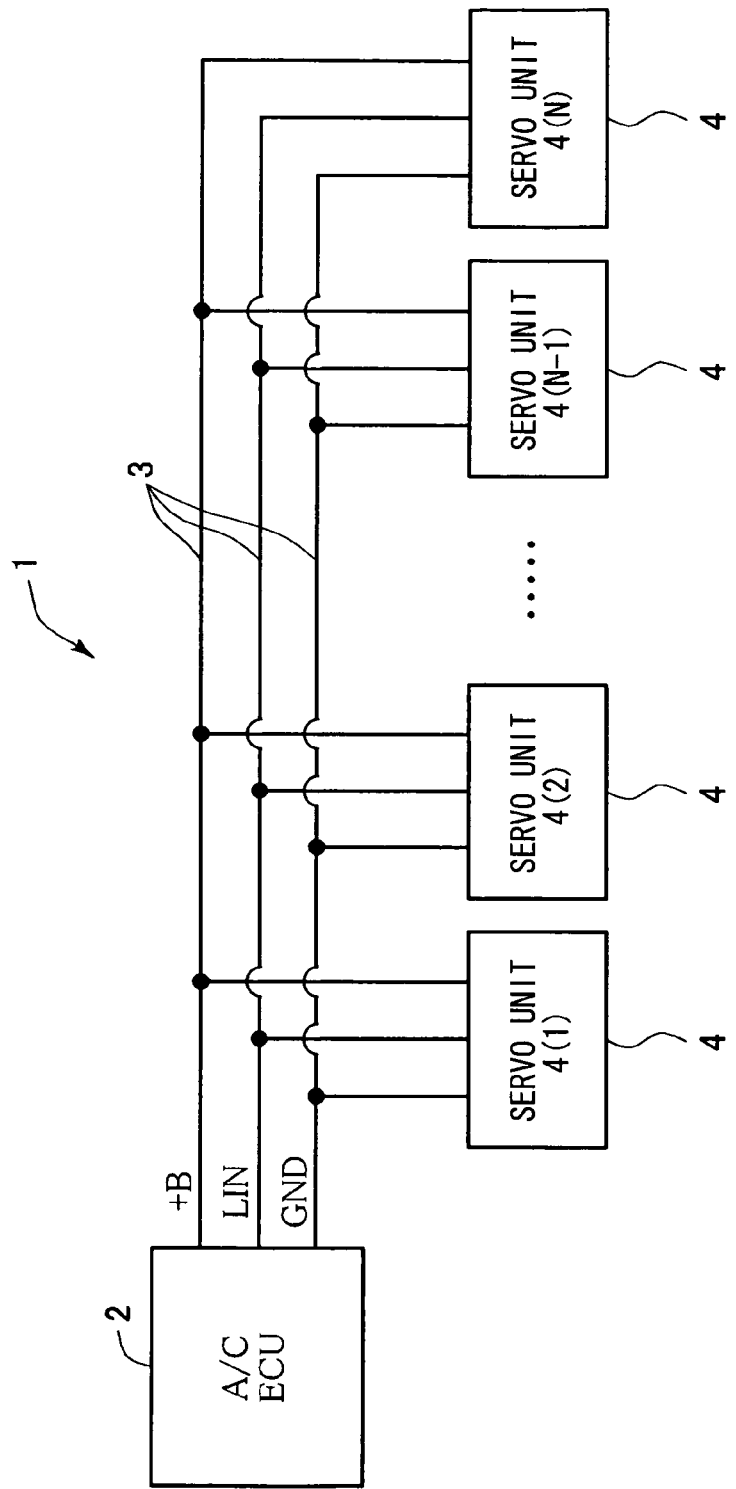
FIG. 1 is a block diagram showing a servomotor control system.

FIG. 1 shows a servomotor control system 1 according to an example embodiment. In the system 1, an air conditioner ECU (A/C ECU) 2 provides an integrated control unit. The A/C ECU 2 controls operation of an in-vehicle air conditioning system. Multiple servomotor units 4 are coupled with the A/C ECU 2 via a communication network 3. The communication network 3 is provided by a LIN (local interconnect network) communication bus, a power source line +B and a ground line GND. A motor 5 is connected to the servomotor unit 4. The motor 5 is energized via the power source line +B and the servomotor unit 4. The power source line +B is coupled with a. positive terminal of an in-vehicle battery. The ground line GND is coupled with a negative terminal of the battery. Alternatively, the ground line GND may be coupled with another ground point. The integrated control unit 2 provides a LIN master node, and the servomotor unit 4 provides a UN slave node.

Figure 2:
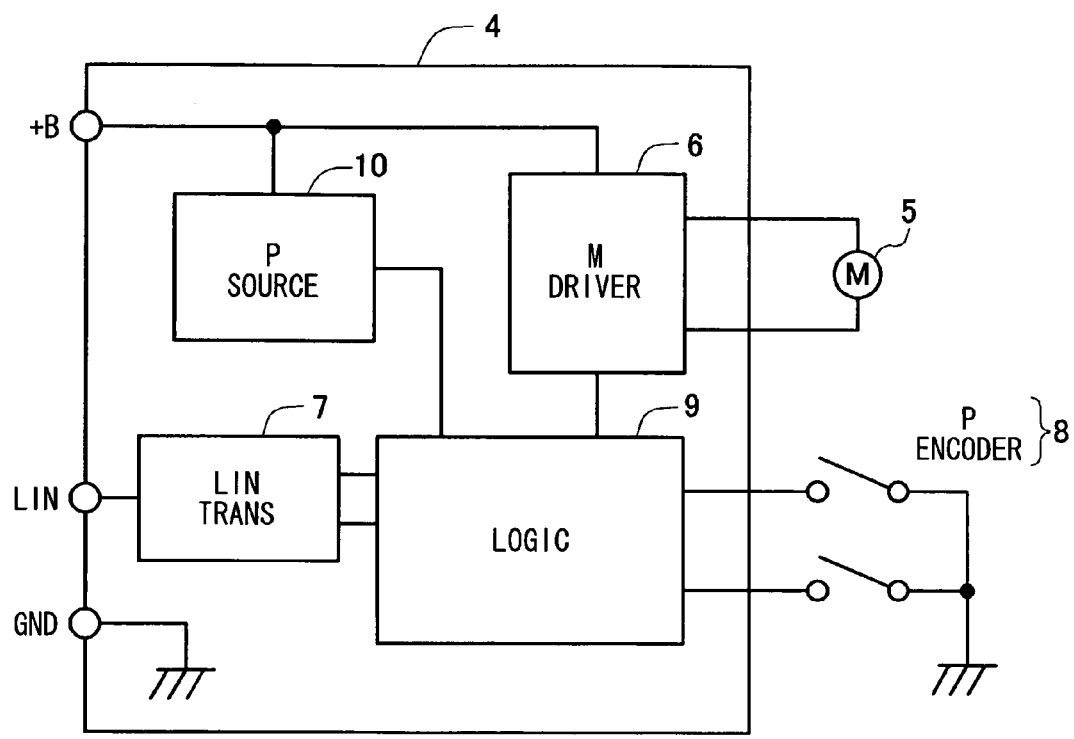
FIG. 2 is a block diagram showing a servomotor unit according to a first embodiment.

FIG. 2 shows an individual servomotor unit 4. The unit 4 includes a motor driver 6, a LIN transceiver 7 as a communication element, a logic circuit 9 as a rotation position calculator, a motor driving instruction outputting element and a current rotation position correcting element, and a power source circuit 10. A pulse encoder 8 is coupled with the logic circuit 9. The pulse encoder 8 rotates synchronization with the motor 5. The power source circuit 10 supplies a signal voltage to the logic circuit 9 and a motor driving voltage to the motor driver 6.

The pulse encoder 8 is an increment type pulse encoder for detecting rotation of the motor 5 in both directions. The encoder includes a rotation pulse waveform generation element having two channels, which has an advance angle relationship of a phase in an output waveform. The advance angle relationship is reversed according to a rotation direction of the motor 5. The rotation pulse waveform generation element outputs a normal waveform pattern and a specific original point waveform pattern. The specific original point waveform pattern is distinguishable from the normal waveform pattern when the motor reaches the original point. The operation and the structure of the rotation pulse waveform generation element is described in US Patent Application Publication No. 2004/0124797 corresponding to JP-A-2004-215488.The pulse encoder 8 includes a rotation disk (not shown), which is coupled with a rotation shaft of the motor 5. Two slit rows for generating a rotation pulse are concentrically formed in the rotation disk. Further, two pairs of a light emission element such as a LED and a light receiver such as a photo transistor are arranged such that the light emission element and the light receiver sandwich the disk in a thickness direction of the disk. Specifically, the light emission element and the light receiver are arranged along with each of the slit rows. When the light emission element and the light receiver are not disposed on each slit, the light from the light emission element is prevented from reaching the light receiver. When the light emission element and the light receiver are disposed on each slit, the light from the light emission element reaches the light receiver. The light receiver outputs a rotation pulse according to the status of the received light. Specifically, the slit of the rotation disk, the light emission element and the light receiver provide the rotation pulse waveform generating element.

Figure 6:
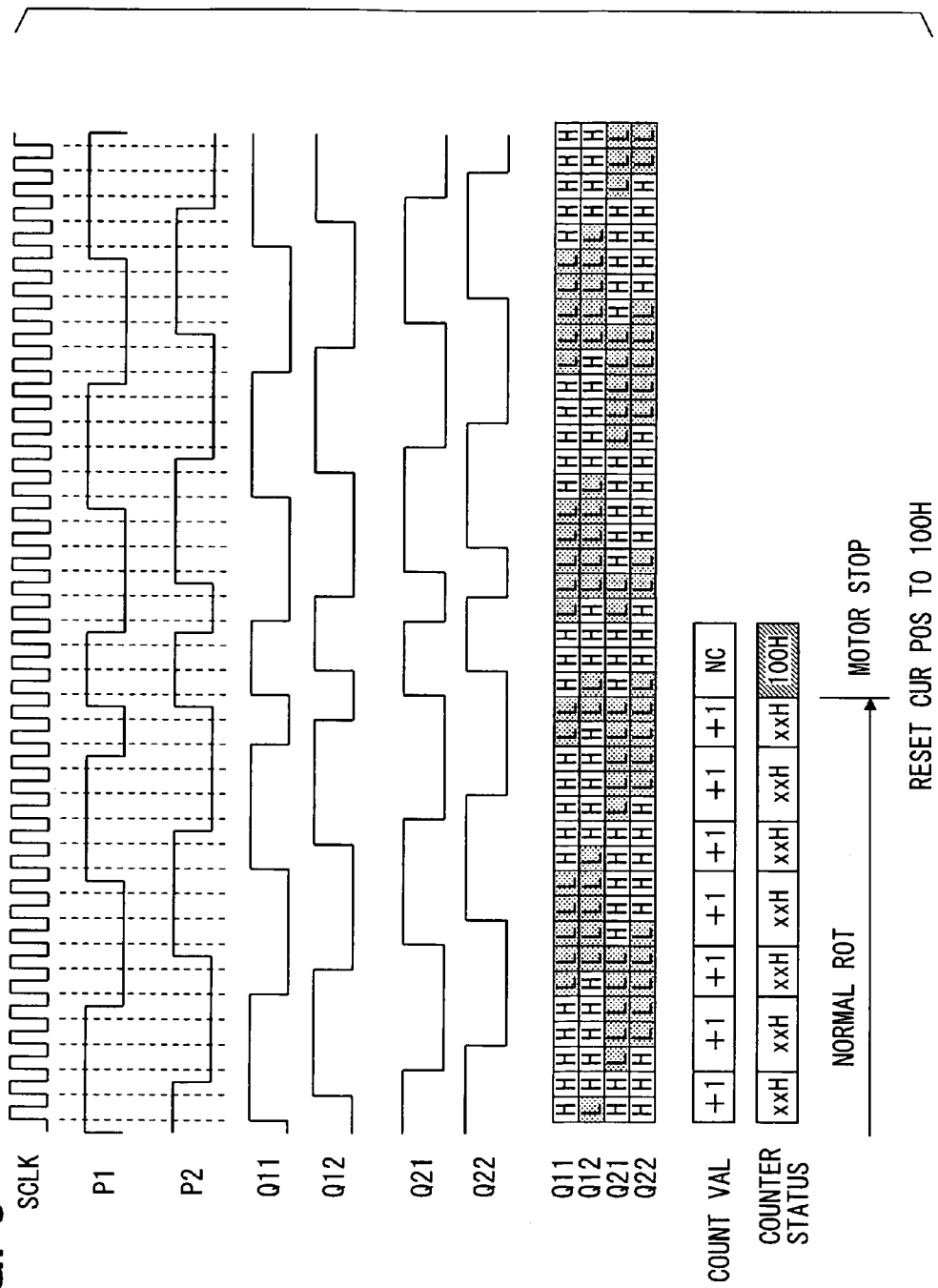
FIG. 6 is a timing chart showing operation in an initialization mode of the servomotor unit in case of normal rotation.

When the light receiver receives the light, the output level of the rotation pulse from the light receiver is defined as a high level, i.e., "H," which represents "1." When the light receiver does not receive the light, the output level of the rotation pulse from the light receiver is defined as a low level, i.e., "L," which represents "0." Further, a high level term and an adjacent low level term provide one wavelength term. As shown in FIG. 6, two slit rows are formed on the disk such that rotation pulse waveforms corresponding to the slit rows generated by rotation of the motor 5 are displaced by a one-fourth Of a wavelength from each other. Specifically, the phase of one rotation pulse corresponding to one slit row shifts by one-fourth of the wavelength from the phrase of the other rotation pulse corresponding to the other slit row. Here, P1 and P2 in FIG. 6 represent rotation pulses corresponding to two slit rows. An advance angle relationship of a phase of the output waveform is reversed according to the rotation direction of the motor 5. Specifically, the rotation direction of the motor 5, i.e., the rotation direction of the rotation disk is determined based on information whether a rising edge in the high level term of the rotation pulse P1 corresponding to one slit row generates prior to or after a rising edge in the high level term of the rotation pulse P2 corresponding to the other slit row. These waveforms are normal waveform patterns. The rotation disk further includes an original point detection slit corresponding to the original point so that only one detection silt is formed on the disk. Each slit row includes only one original point detection slit on the disk. The phase of the high level term and the phase of the low level term of one slit row coincide with the phase of the high level term and the phase of the low level term of the other slit row, respectively. The period of the pulse corresponding to the original point detection slit is a half of the period of the normal waveform pattern. When the original point detection slit is detected, the rising edge and the falling edge in the high level term of the rotation pulse waveform corresponding to one slit row coincide with the rising edge and the falling edge in the high level term of the rotation pulse waveform corresponding to the other slit row. Specifically, the rising edge and the falling edge in the pulse corresponding to one slit row generate at the same time of the rising edge and the falling edge in the pulse corresponding to the other slit row. Here, in the normal waveform pattern, the rising edge and/or the falling edge in the high level term of the pulse corresponding to one slit row generate at the different time from the rising edge and/or the falling edge in the high level term of the pulse corresponding to the other slit row. Thus, the waveform pattern corresponding to the original point detection slit is distinguishable from the normal waveform pattern. Thus, the waveform pattern corresponding to the original point detection slit is defined as an original point waveform pattern. Thus, the original point detection element for detecting the original point with respect to rotation of the motor 5 is provided by the above construction. An independent slit showing the original point may be arranged on a position of the disk, which is different from two slit rows in the radial direction of the disk, and the light emission element and the light receiver may be arranged over and under the disk, which is different from two slit rows in the radial direction of the disk.

Figure 3A:
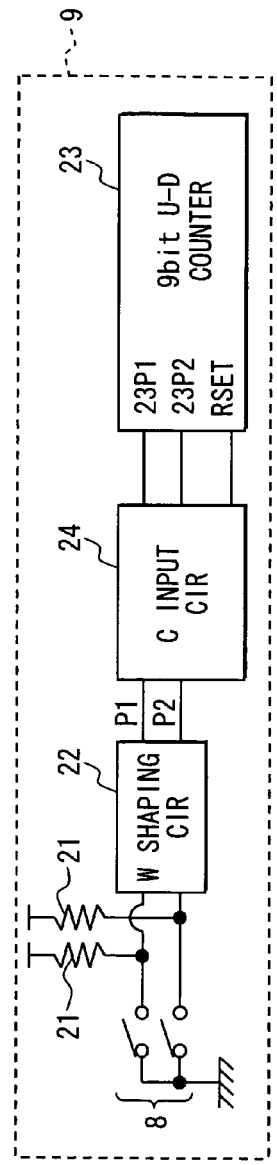
FIG. 3A is a circuit diagram showing a pulse counter circuit and a reset circuit in a logic circuit of the servomotor unit.
Figure 3B:
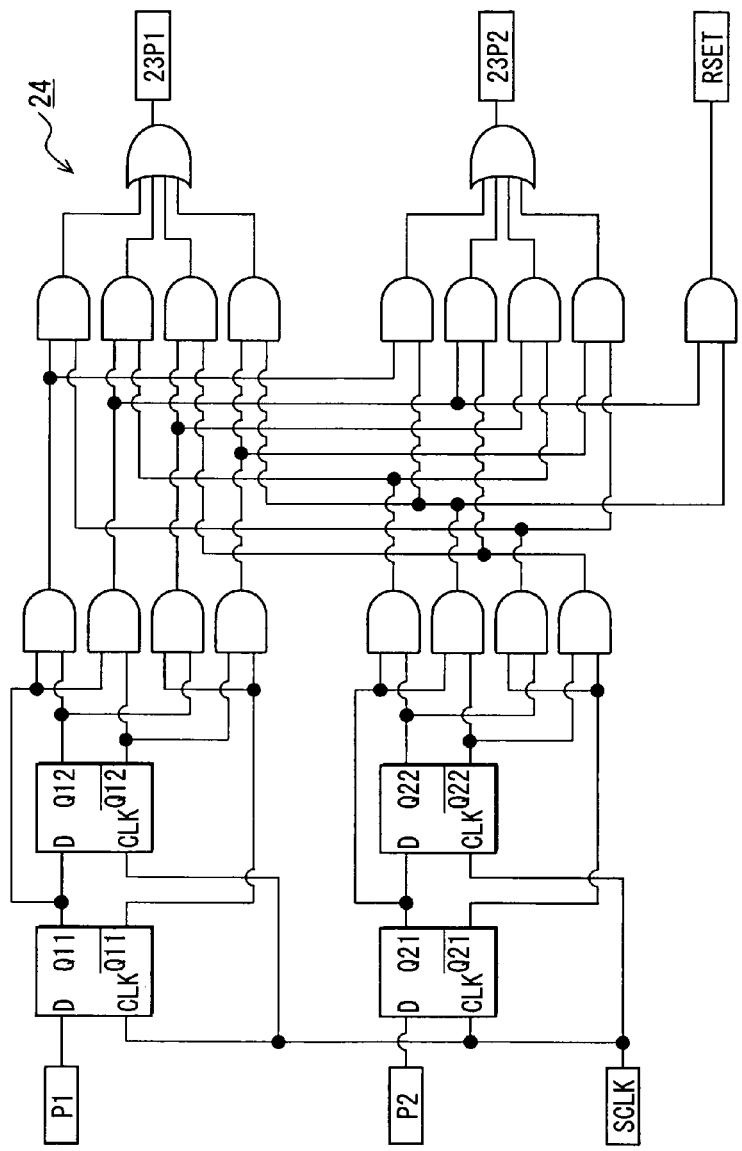
FIG. 3B is a circuit diagram. showing a counter input circuit in FIG. 3A.

Next, the logic circuit 9 includes a micro computer for sending a driving instruction signal to the motor driver 6. As shown in FIG. 3, the logic circuit 9 further includes a counter logic circuit. The counter logic circuit includes a nine-bit up-down counter 23. The rotation pulse waveform outputs from the pulse encoder 8 corresponding to two slit rows, and inputs into a counter input circuit 24. In the present embodiment, a specific original point waveform pattern is detected. A waveform shaping circuit 22 shapes a waveform input from the pulse encoder 8. The shaped encoder signals P1, P2 as a shaped pulse signal in the waveform shaping circuit 22 are input into two D flip-flop terminals, respectively. Specifically, the shaped signals are sampled. A sampling clock signal SCLK has a frequency, which is sufficiently higher than a frequency of the shaped encoder signals P1, P2. In this embodiment, the frequency of the sampling clock signal SCLK is 4 KHz. One shaped encoder signal P1 is sampled at a time when the sampling clock signal SCLK rises, and therefore, a Q11 signal, a Q12 signal, a bar-Q11 signal and a bar-Q12 signal are obtained. Here, for example, the bar-Q11 signal represents a logical inversion data of the Q11 signal. Similarly, the other shaped encoder signal P2 is also sampled at the time when the sampling clock signal SCLK rises, and a Q21 signal, a Q22 signal, a bar-Q21 signal and a bar-Q22 signal are obtained.

Based on the above eight signals, a gate matrix of the counter input circuit 24 generates a nine-bit up and down signal for the nine bit up down counter 23. FIG. 4 shows a nine-bit counter operation. As shown in FIG. 4, when the Q11 signal is "H," the Q12 signal is "H," the Q21 signal is "L," and the Q22 signal is "H," an up output signal becomes "H." Thus, the up down counter 23 counts up. When the Q11 signal is "H," the Q12 signal is "L," the Q21 signal is "H," and the Q22 signal is "H," the up output signal becomes "H," so that the up down counter 23 counts up. When the Q11 signal is "L," the Q12 signal is "L," the Q21 signal is"H," and the Q22 signal is the up output signal becomes "H," so that the up down counter 23 counts up. When the Q11 signal is "H," the Q12 signal is "H," the Q21 signal is "H," and the Q22 signal is "L," a down output signal becomes "H," so that the up down counter 23 counts down. When the Q11 signal is "H," the Q12 signal is "L," the Q21 signal is "L," and the Q22 signal is "L," the down output signal becomes "H," so that the up down counter 23 counts down. When the Q11 signal is "L," the Q12 signal is "H," the Q21 signal is "H," and the Q22 signal is "H," the down output signal becomes "H," so that the up down counter 23 counts down. When the Q11 signal is "L," the Q12 signal is "L," the Q21 signal is "L," and the Q22 signal is "H," the down output signal becomes "H," so that the up down counter 23 counts down.

When the Q11 signal is "H," the Q12 signal is "L," the Q21 signal is "H," and the Q22 signal is "L," a reset signal becomes "H," so that a count value of the up down counter 23 is reset to "100H."

When the Q11 signal, the Q12 signal, the Q21 signal and the Q22 signal provide values other than the above cases, i.e., when the Q11 signal, the Q12 signal, the Q21 signal and the Q22 signal provide other cases, the up output signal, the down output signal and the reset output signal are not changed, and therefore, the count value of the up down counter 23 is maintained. In FIG. 4, "NC" means that the up-down counter 23 does not count up. and down.

A transition term, in which the edge is not input into the terminals 23P1, 23P2, is disposed just after and just before the original point waveform pattern. A logic circuit is prepared such that, in the transition term, the edge input into the input terminal 23P2 is used for counting up, and the edge input into the input terminal 23P1 is used for counting down. Thus, an angle term, at which the counter 23 cannot count up and down, is reduced. The up-down counter 23 as a pulse counter obtains a rotation detection signal from a rotation sensor.

Further, the counter 23 functions as a rotation position calculator for calculating a current rotation position of the motor 5 based on the rotation detection information.

In FIG. 3, the light receiver of the pulse encoder 8 is a photo transistor. A signal power source is coupled with an input signal line via a pull-up resistor 21 so that the input signal line is grounded when the photo transistor turns on, and the input signal line provides the power source voltage when the photo transistor turns off. The ground level is defined as "L," and the power source voltage is defined as "H." The encoder 8 is coupled with the waveform shaping circuit 22 via the input signal line.

Two rotation pulse waveforms P1, P2 as shaped encoder signals are distributed to the counter input circuit 24, which is attached to the outside of the up-down counter 23. Two rotation pulse waveforms P1, P2 are input into the counter input circuit 24. The counter input circuit 24 outputs the up output signal, the down output signal and the reset output signal, which are input into the up down counter 23. As shown in FIG. 6, the logical multiplication circuit 27 outputs the reset signal only when the original point waveform pattern appears. Then, the counter value of the up-down counter 23 is reset to an original point value, which is defined as "100H" in FIG. 4. Specifically, when the original point detector detects the original point, the current rotation position correcting element corrects, i.e., resets the calculation value of the current rotation position calculated by the rotation position calculator to be the original point value, which is preliminary stored in the servomotor unit 4.

System operation in an initialization mode will be explained with reference to FIG. 5. When the ignition switch of a vehicle turns on, the system 1 identifies detection operation of the original point in the initialization mode in step S1. In step S2, the integrated control unit 2 (i.e., the air conditioning system ECU) assumes that the original point exists to a certain rotation direction, and then, the control unit 2 tentatively determines the certain rotation direction as a tentative rotation direction. For example, a forward direction is preliminary determined as the tentative rotation direction. Since the servomotor unit does not specified the original point and the current rotation position, the servomotor unit tentatively sets a tentative target position and a tentative current rotation position. Here, when the motor rotates and moves to the tentative target position, the motor surely reaches the original point. For example, the unit 2 may set the tentative target position such that the tentative target position corresponds to almost one cycle rotation stroke of the rotation disk of the encoder 8 just before one slit, but the disk does not rotate completely one cycle. The unit 2 sends information about the tentative target position and the tentative current rotation position together with information about an instruction command for the initialization operation to the servomotor unit 4 in step S3. The initialization operation is thee original point detection operation, and the instruction command defines that the value of "INT" is equal to one (i.e., INT=1).

The logic circuit 9 of the servomotor unit 4 starts to drive the motor 5 with using the motor driver 6. Further, the logic circuit 9 starts to count the pulse with using the tentative current rotation position as an origin, which is received from the unit 2 according to the nine-bit counter operation in FIG. 4. The information of the counted pulse is transmitted to the integrated control unit 2 in step S4. When the counted pulse provides the normal waveform pattern, the unit 4 continues to drive the motor 5. Further, the unit 4 transmits the information of the counted pulse to the ECU 2 successively. When the counted pulse provides the original point waveform pattern so that the unit 4 detects the original point, the logic circuit 9 stops driving the motor 5. In step S5, the unit 2 determines whether the motor 5 stops. When the motor 5 stops, it goes to step S6. When the motor 5 does not stop, it goes to step S4. In step S6, the up-down counter 23 resets the counted pulse to the original point value, and further, the unit 4 sends information of completion of the reset operation to the integrated control unit 2. When the unit 2 receives the information, the unit 2 sends a command to the unit 4 in step S7, the command providing to end the initialization mode and to switch from the initialization mode to the normal mode. In this embodiment, the command is defined as "INT=0."

Figure 5:
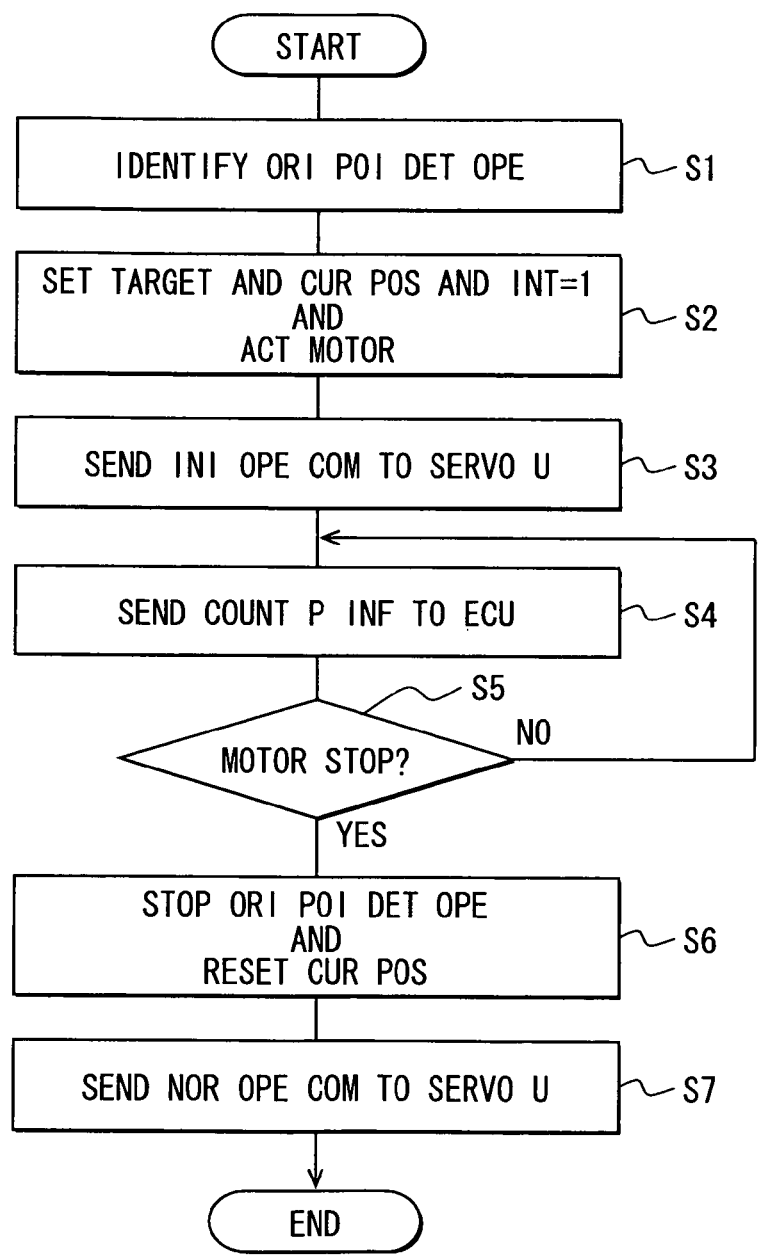
FIG. 5 is a flowchart showing operation of the servomotor control unit.

As shown in FIG. 5, the original point determination process and the correction process for resetting the current rotation position to the original point are executed only in the servomotor unit 4. Specifically, the unit 4 completes both processes. As a result, since the unit 4 detects the original point, it is not necessary for the unit 4 to obtain the correct current rotation position information from the integrated control unit 2. In a conventional art, a time delay for communication between the unit 2 and the unit 4 may cause wrong current rotation position information if the motor position is displaced by external force or the like during the dead time as a waiting time. However, in the present embodiment, the current rotation position information is correctly stored in the servomotor unit 4. Thus, the difficulty that the original point is deviated from the proper point when the motor is displaced is improved. Further, it is not necessary to perform a step for obtaining the correct current rotation position from the unit 2. A communication sequence for motor control is simplified.

Figure 7:
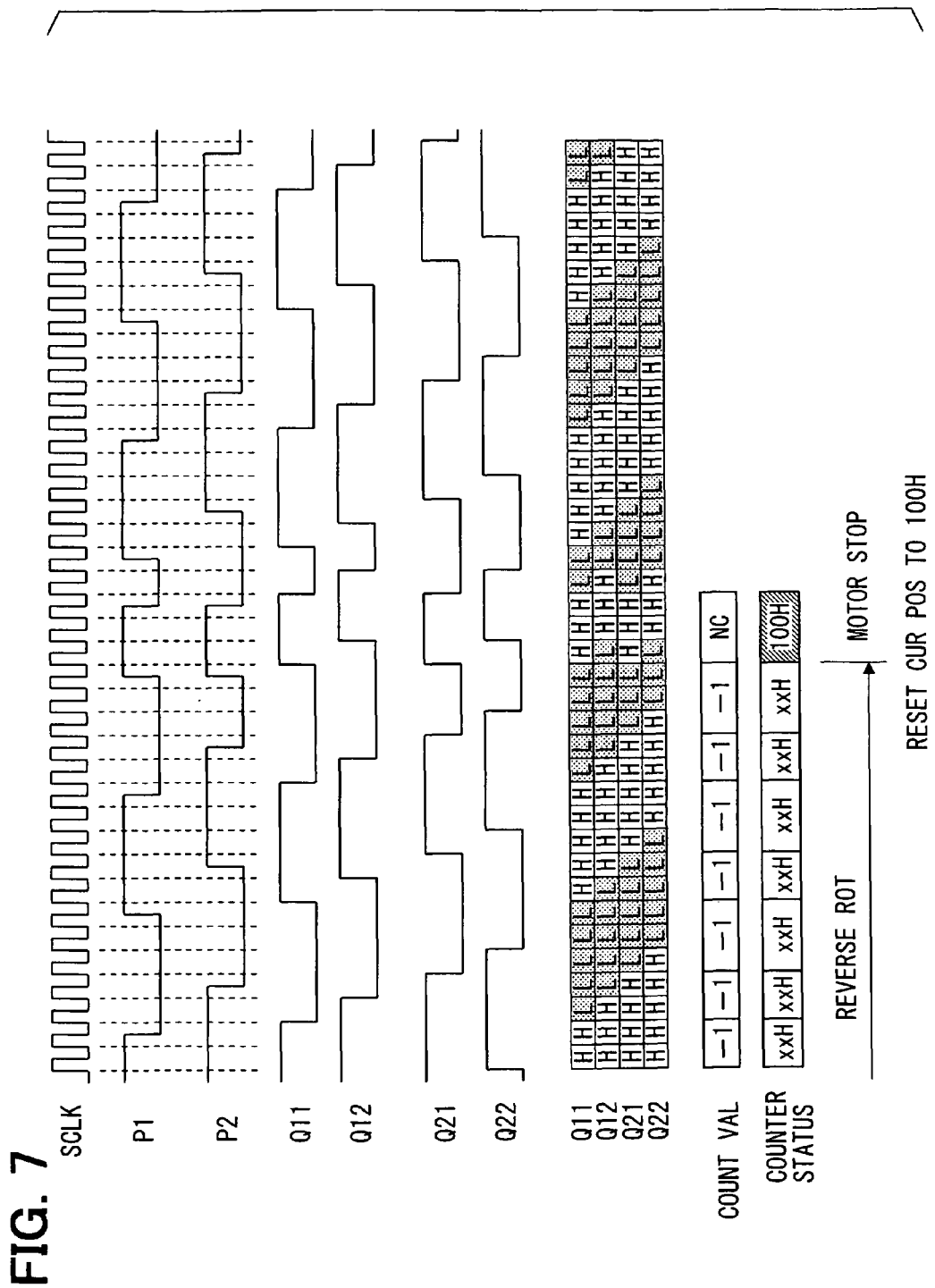
FIG. 7 is a timing chart showing operation in the initialization mode of the servomotor unit in case of reverse rotation.
Figure 8:
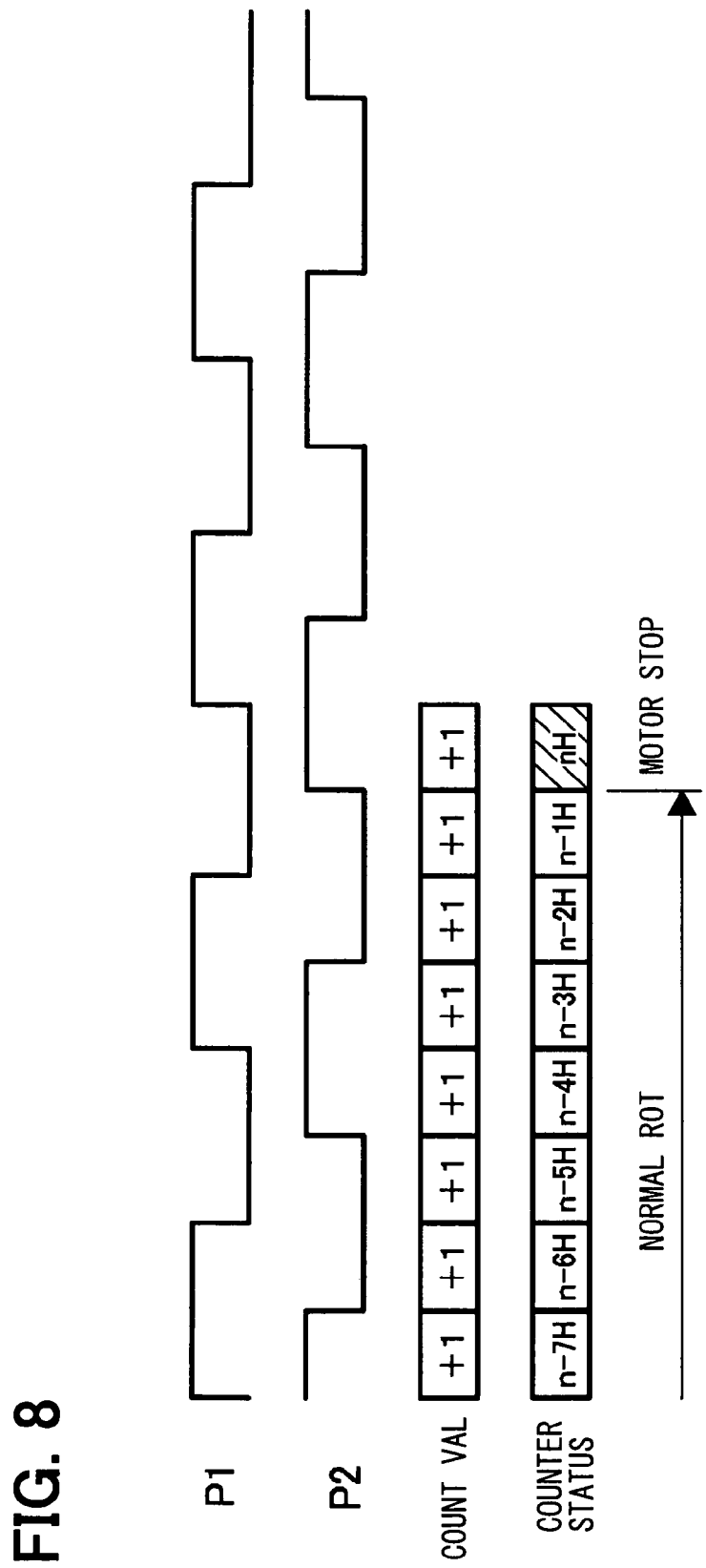
FIG. 8 is a timing chart showing operation in a normal mode of the servomotor unit without passing through the original point in case of normal rotation.
Figure 9:
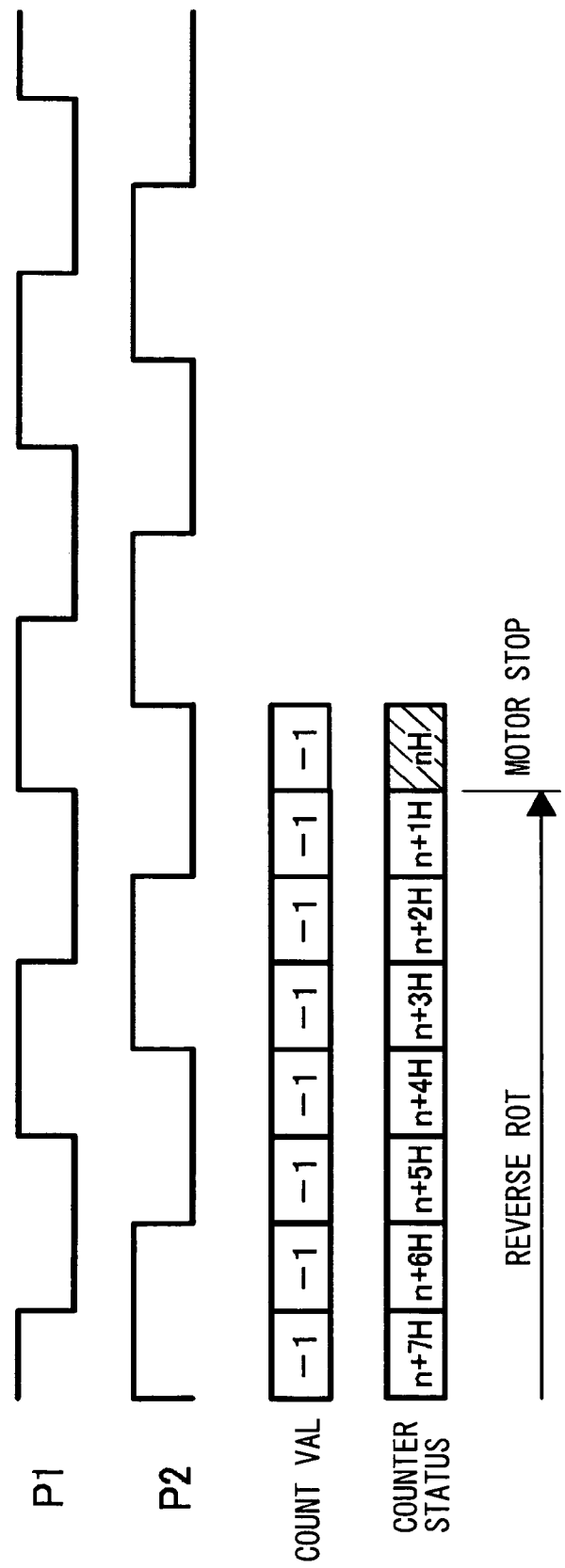
FIG. 9 is a timing chart showing operation in the normal mode of the servomotor unit without passing through the original point in case of reverse rotation.

FIG. 6 shows the sampling clock signal SCLK, the shaped rotation pulse P1 as a pulse input waveform of the rotation pulse corresponding to the first slit row, the other shaped rotation pulse P2 as a pulse input waveform of the rotation pulse corresponding to the second slit row, the Q11-Q22 signals, the count operation of the up-down counter 23, and the variation of the counter status when the motor 5 rotates normally in the initialization mode. Specifically, FIG. 6 shows the original point detection operation in the initialization mode of the servomotor unit 4 in case of motor normal rotation and INT=1.Here, the count value "+1" shows the increment, and the count value "−1" shows' the decrement, and the count value "NC" shows that the up-down counter 23 does not count up and down. FIG. 7 shows the sampling clock signal SCLK, the shaped rotation pulse P1 as a pulse input waveform of the rotation pulse corresponding to the first slit row, the other shaped rotation pulse P2 as a pulse input waveform of the rotation pulse corresponding to the second slit row, the Q11-Q22 signals, the count operation of the up-down counter 23, and the variation of the counter status when the motor 5 rotates reversely in the initialization mode. Specifically, FIG. 7 shows the original point detection operation in the initialization mode of the servomotor unit 4 in case of motor reverse rotation and INT=1.As shown in FIGS. 6 and 7, even in a case where the motor 5 rotates reversely and normally, the motor stops rotating when the original point waveform pattern is detected. Further, the counter status is reset to the original point (i.e., 100H). FIG. 8 shows the normal stop operation in the normal mode of the servomotor unit 4 without passing through the original point in case of motor normal rotation and INT=0.FIG. 9 shows the normal stop operation in the normal mode of the servomotor unit without passing through the original point in case of reverse rotation and INT=0.In FIGS. 8 and 9, the target position is defined as"n." As shown in FIGS. 8 and 9, in the normal mode, the servomotor unit 4 stops to drive the motor 5 when the rotation position of the motor 5 reaches the target position of "n," which is obtained from the integrated control unit 2. This is a normal control process. In FIGS. 8 and 9, the disk does not reach the original point even when the motor reaches the target position. Thus, the original point waveform pattern is not detected.

Figure 10:
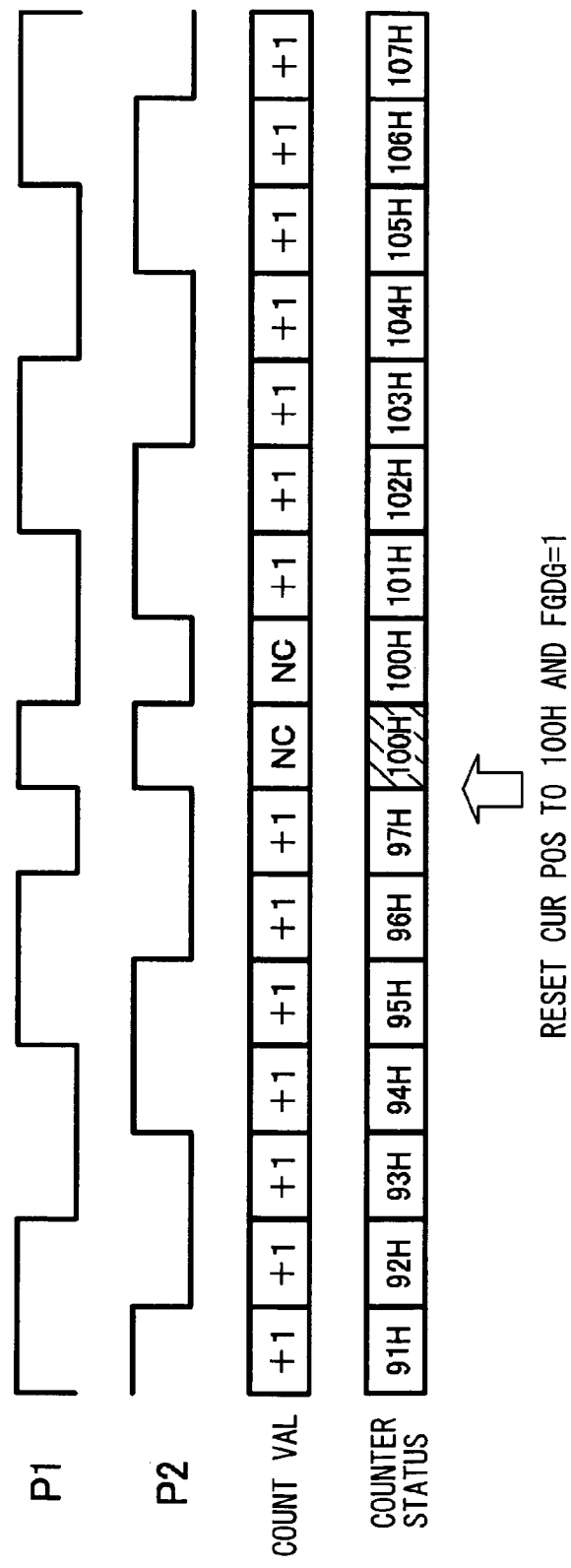
FIG. 10 is a timing chart showing operation in a normal mode of the servomotor unit with passing through the original point and with a rotation position shift in case of normal rotation.
Figure 11:
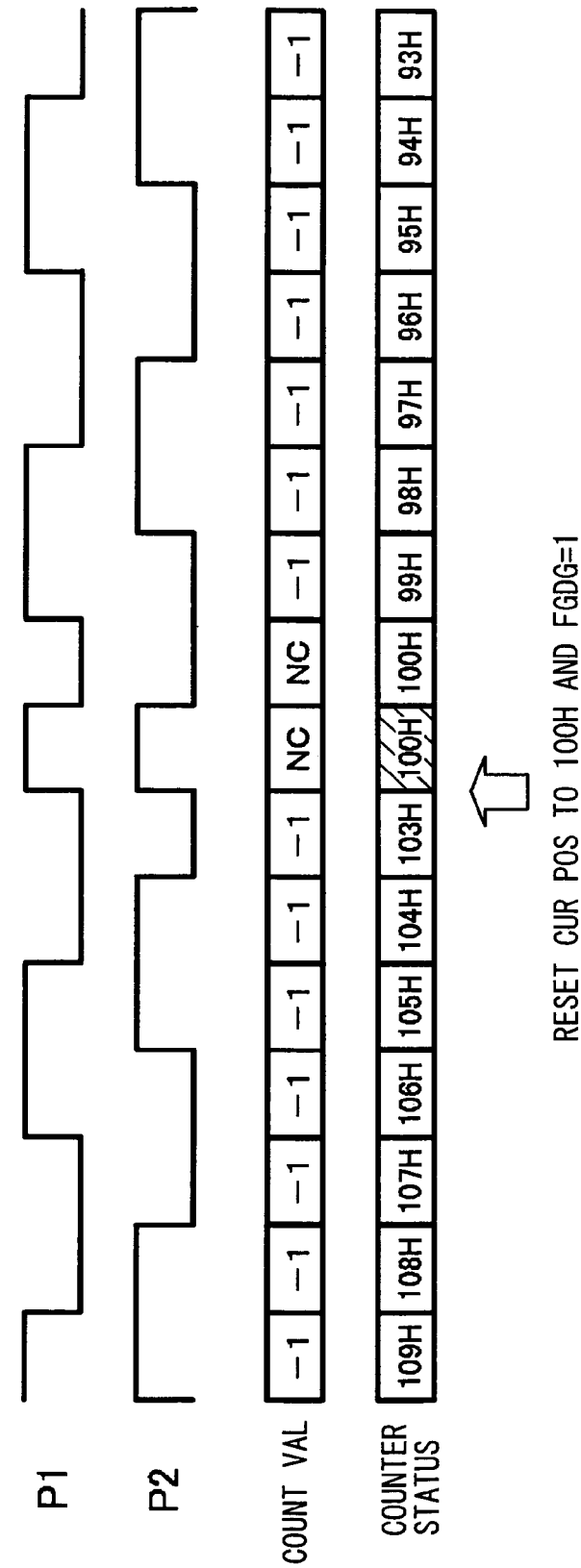
FIG. 11 is a timing chart showing operation in the normal mode of the servomotor unit with passing through the original point and with the rotation position shift in case of reverse rotation.

FIG. 10 shows the current rotation position reset operation in the normal mode of the servomotor unit with passing through the original point and with a rotation position shift in case of motor normal rotation and INT=0.FIG. 11 shows the current rotation position reset operation in the normal mode of the servomotor unit with passing through the original point and with the rotation position shift in case of reverse rotation and INT=0.Specifically, in FIGS. 10 and 11, the disk reaches the original point when the motor reaches the target position. Thus, the original point waveform pattern is detected. The current position counter status is reset to the original point value (i.e., 100H). The unit 4 receives a command of "INT=0" showing the normal mode from the integrated control unit 2. The motor does not stop driving.

In FIG. 10, the current position counter status just before the reset operation is "97H." Therefore, the current position counter status cannot reach the original point value of 100H even when the increment is executed once. Further, in FIG. 11, the current position counter status just before the reset operation is "103H." Therefore, the current position counter status cannot reach the original point value of 100H even when the decrement is executed once. Thus, in FIGS. 10 and 11, the difference between the original point value and the current position counter status just before the reset operation is larger than the threshold pulse number. In this case, the threshold pulse number is "1." The rotation position shift occurs. The servomotor unit 4 sets a diagnosis flag FGDG to be "1." When the diagnosis flag FGDG is one, the rotation position shift occurs. When the integrated control unit 2 receives the diagnosis flag FGDG, the unit 2 recognizes that the rotation position shift occurs. Thus, these functions provide a rotation position shift occurrence notification element.

Figure 12:
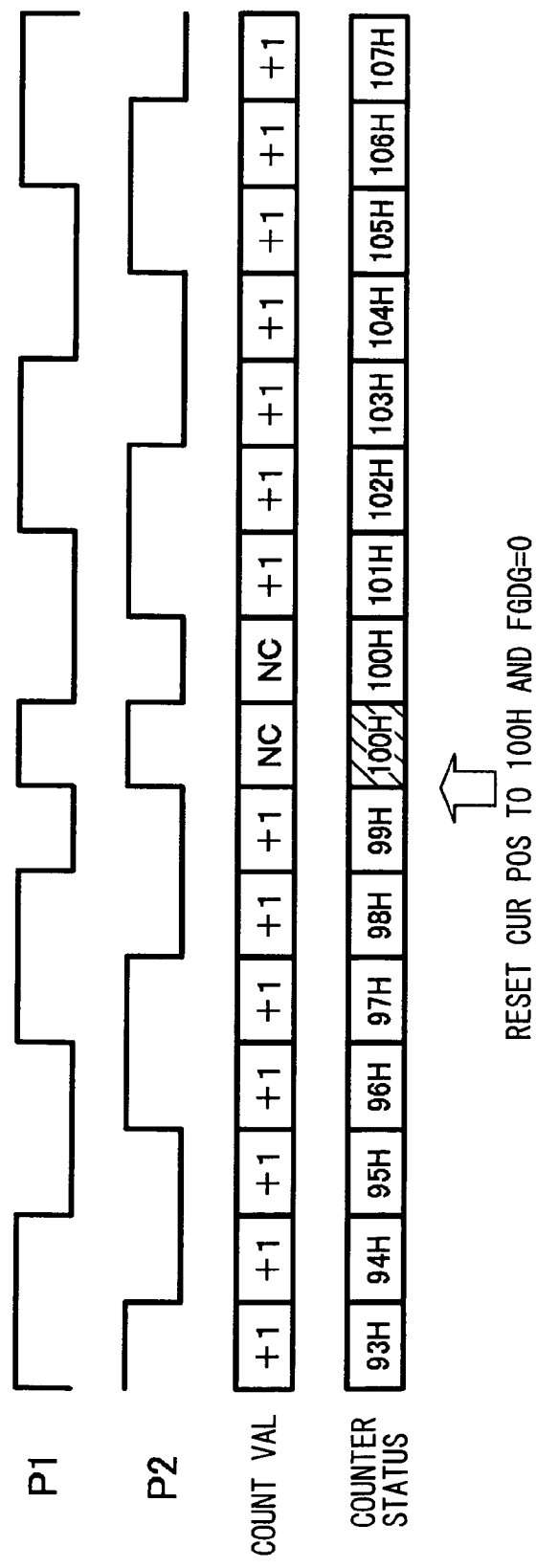
FIG. 12 is a timing chart showing operation in a normal mode of the servomotor unit with passing through the original point and without a rotation position shift in case of normal rotation.
Figure 13:
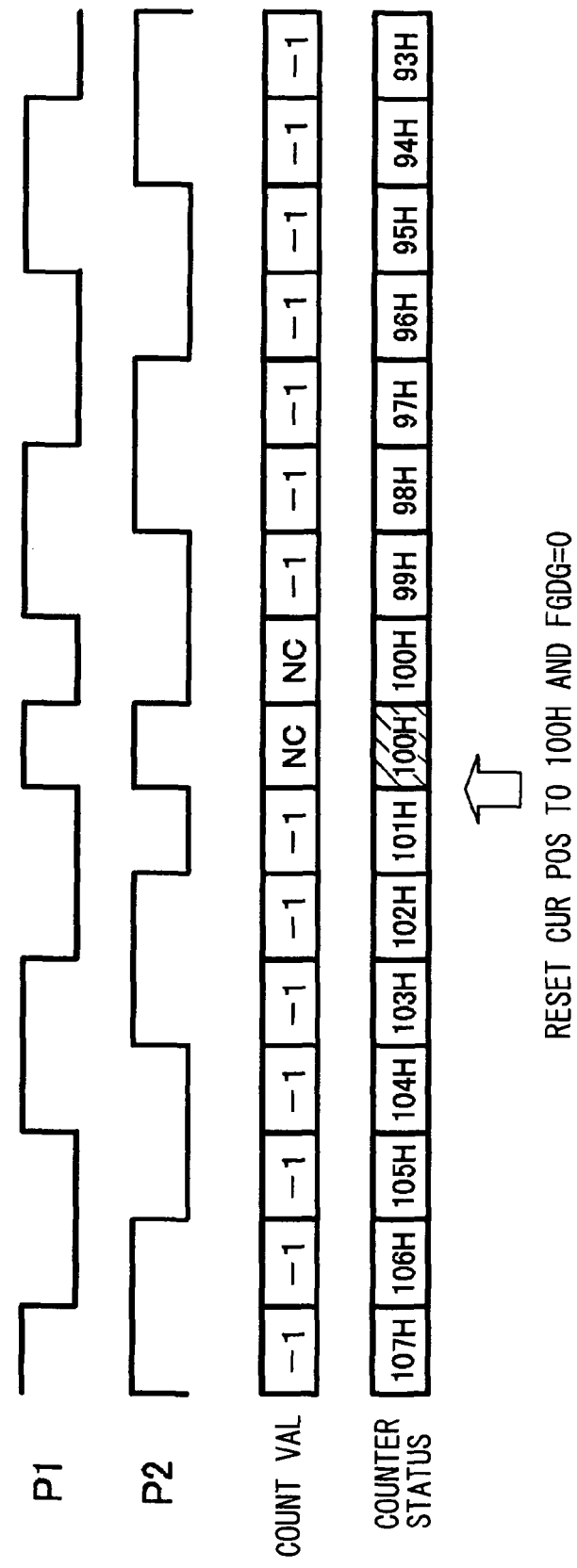
FIG. 13 is a timing chart showing operation in the normal mode of the servomotor unit with passing through the original point and without the rotation position shift in case of reverse, rotation.

FIG. 12 shows the current rotation position reset operation in the normal mode of the servomotor unit with passing through the original point and without a rotation position shift in case of normal rotation and INT=0.FIG. 13 shows the current rotation position reset operation in the normal mode of the servomotor unit with passing through the original point and without the rotation position shift in case of reverse rotation and INT=0.In FIGS. 12 and 13, since the counter status just before the reset operation is "99H" or "101H." Therefore, the current position counter status can reach the original point value of "100H" when the increment or decrement is executed once. Thus, in FIGS. 12 and 13, the difference between the original point value and the current position counter status just before the reset operation is equal to or smaller than the threshold pulse number. In this case, the threshold pulse number is "1." This means that the rotation position shift does not occur. The servomotor unit 4 sets a diagnosis flag FGDG to be "0." When the diagnosis flag FGDG is zero, the rotation position shift does not occur. When the integrated control unit 2 receives the diagnosis flag FGDG, the unit 2 recognizes that the rotation position shift does not occur.

Figure 14:
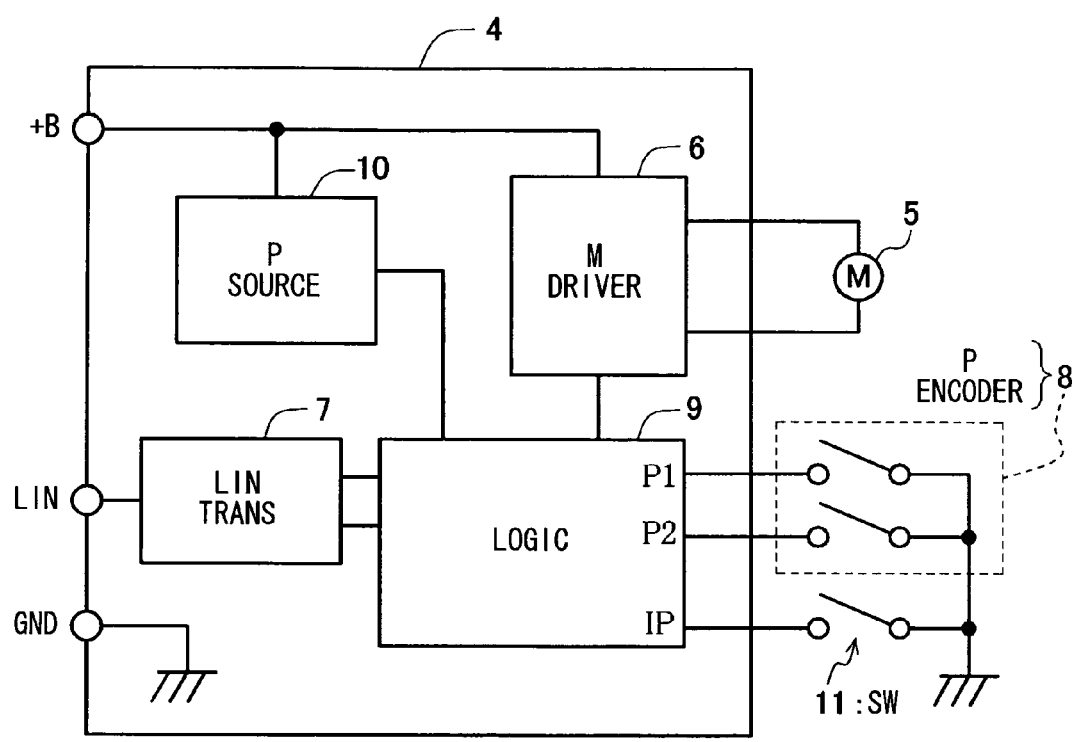
FIG. 14 is a block diagram showing a servomotor unit according to a second embodiment.
Figure 15:
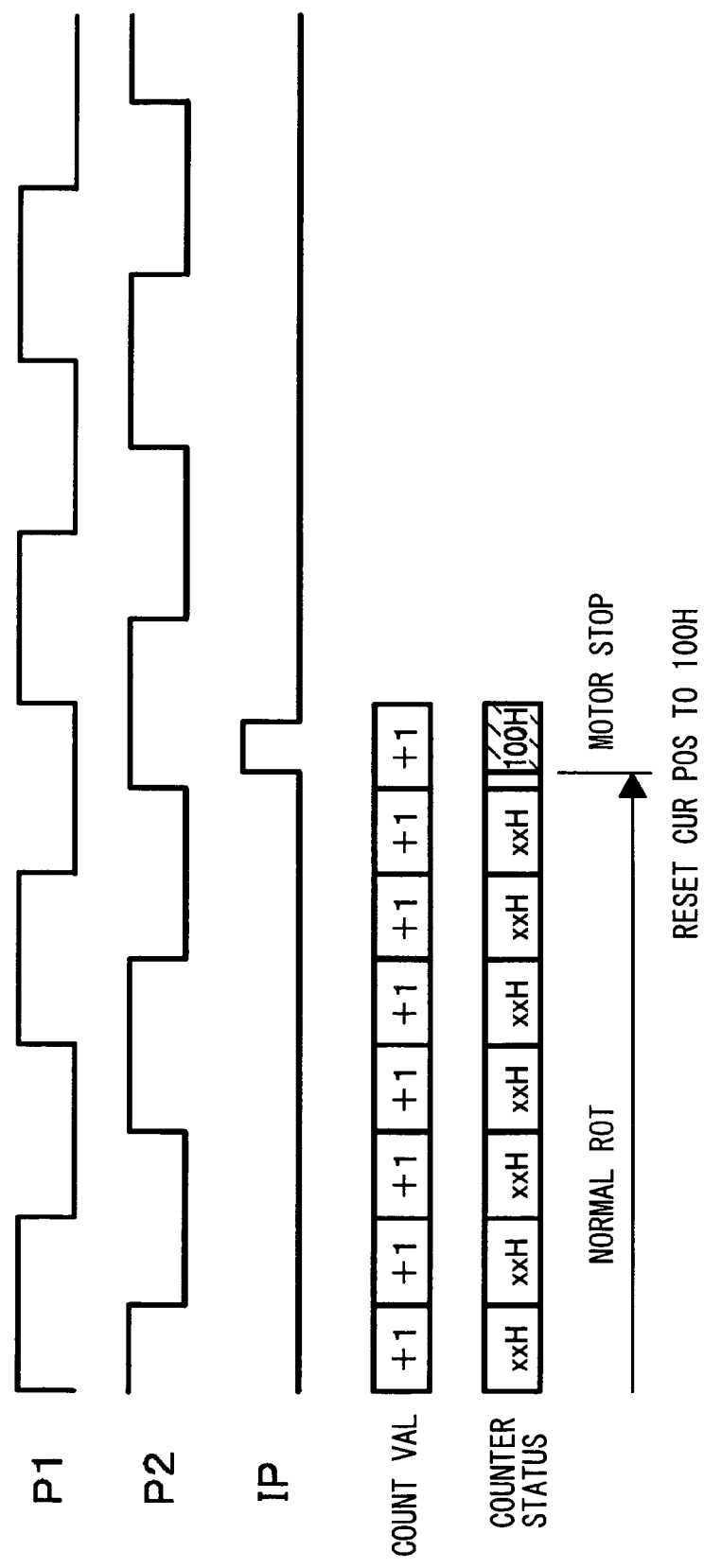
FIG. 15 is a timing chart showing operation in an initialization mode of the servomotor unit in case of normal rotation.
Figure 16:
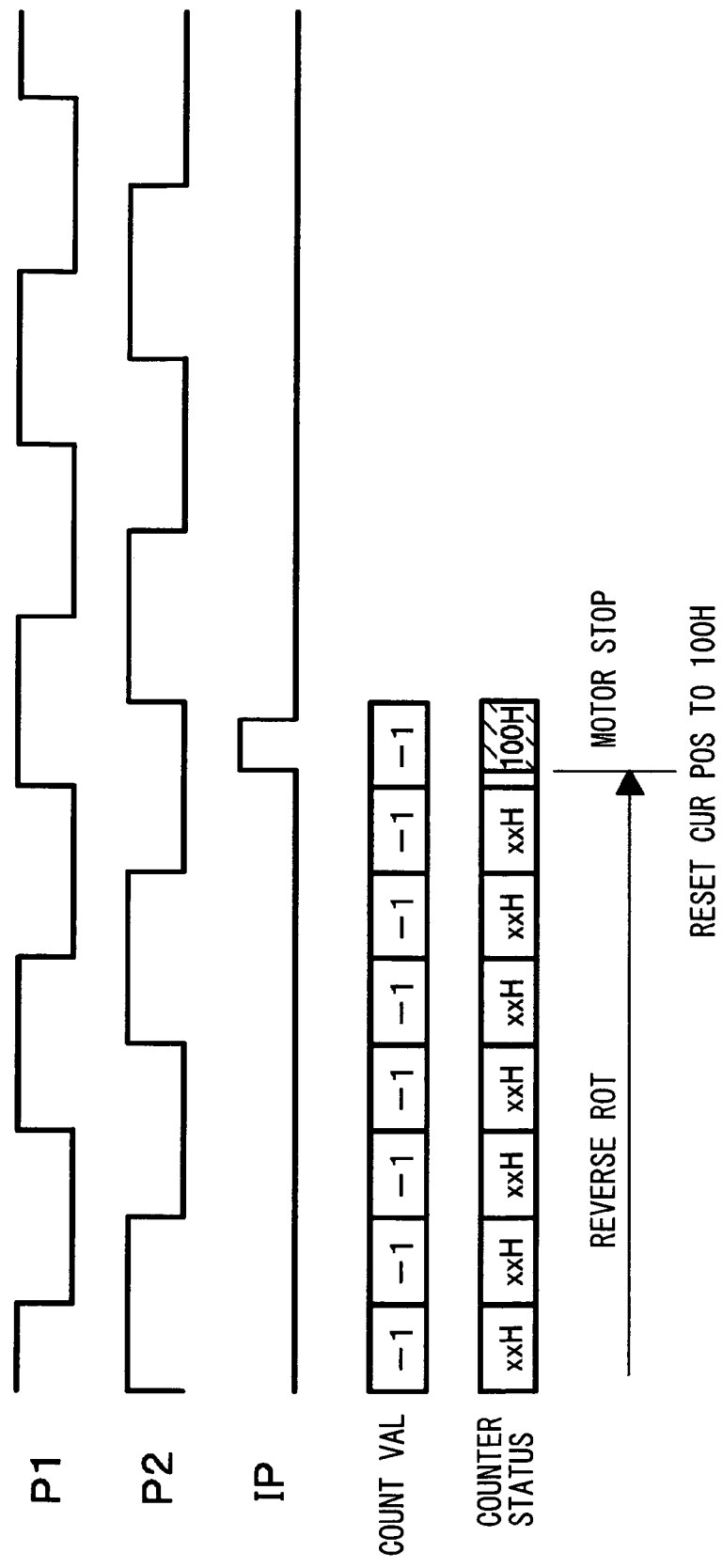
FIG. 16 is a timing chart showing operation in the initialization mode of the servomotor unit in case of reverse rotation.
Figure 17:
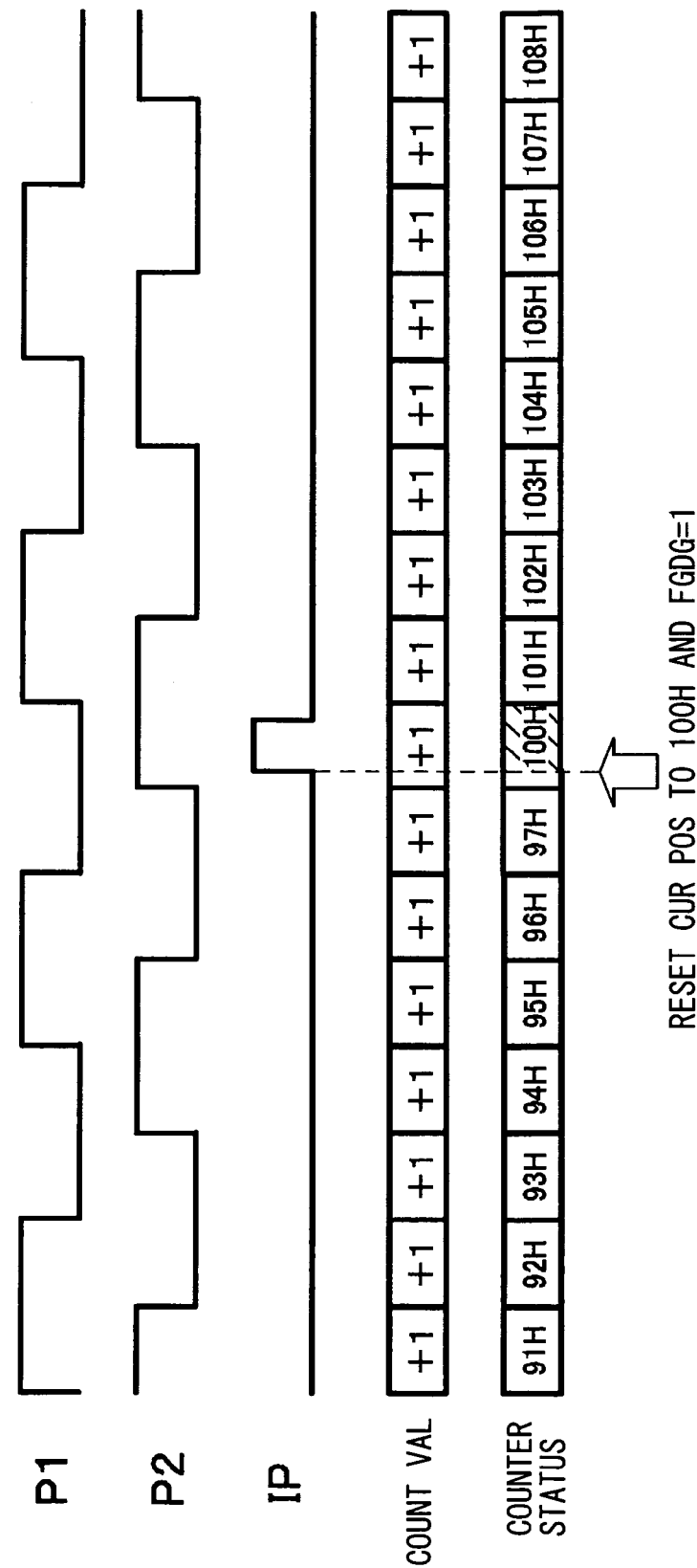
FIG. 17, is a timing chart showing operation in a normal mode of the servomotor unit with passing through the original point and with a rotation position shift in case of normal rotation.
Figure 18:
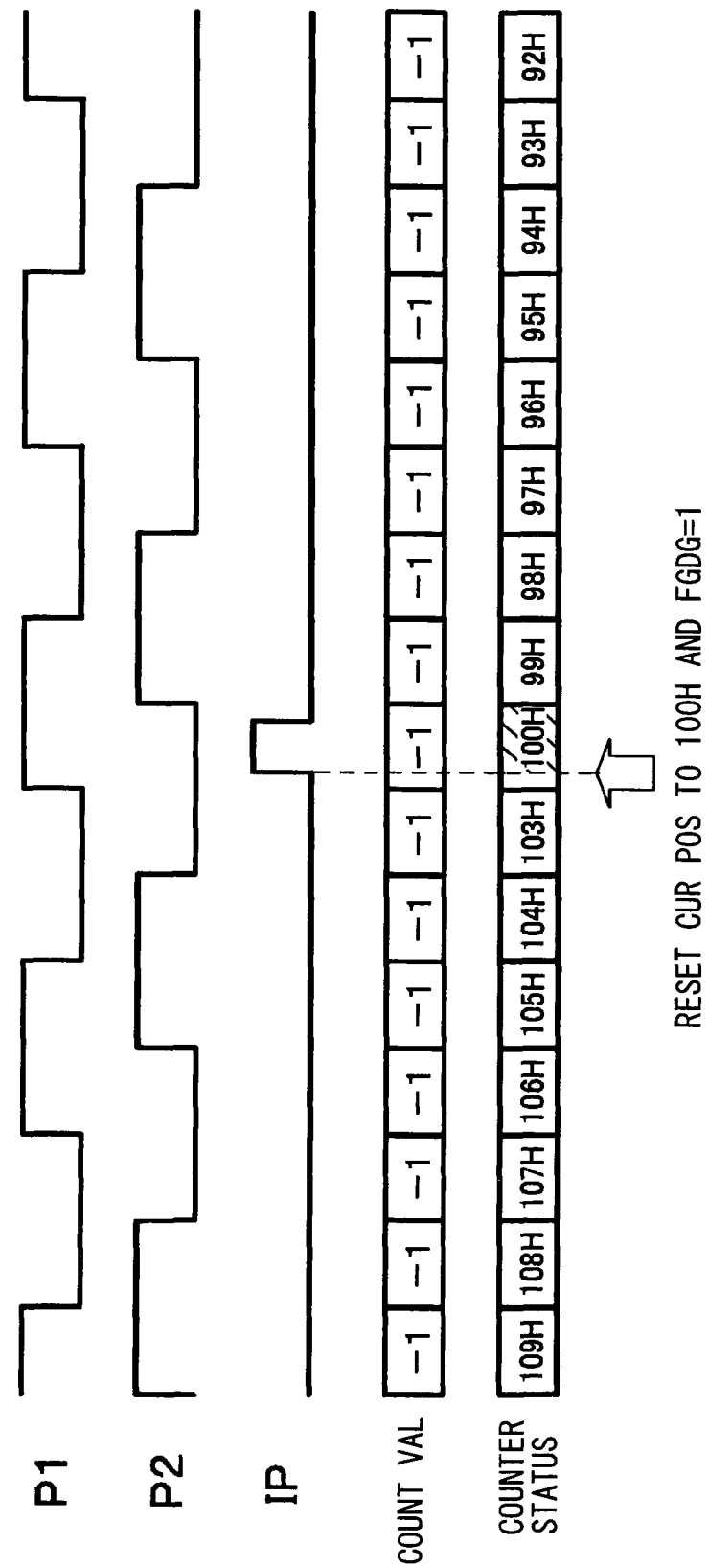
FIG. 18 is a timing chart showing operation in the normal mode of the servomotor unit with passing through the original point and with the rotation position shift in case of reverse rotation.
Figure 19:
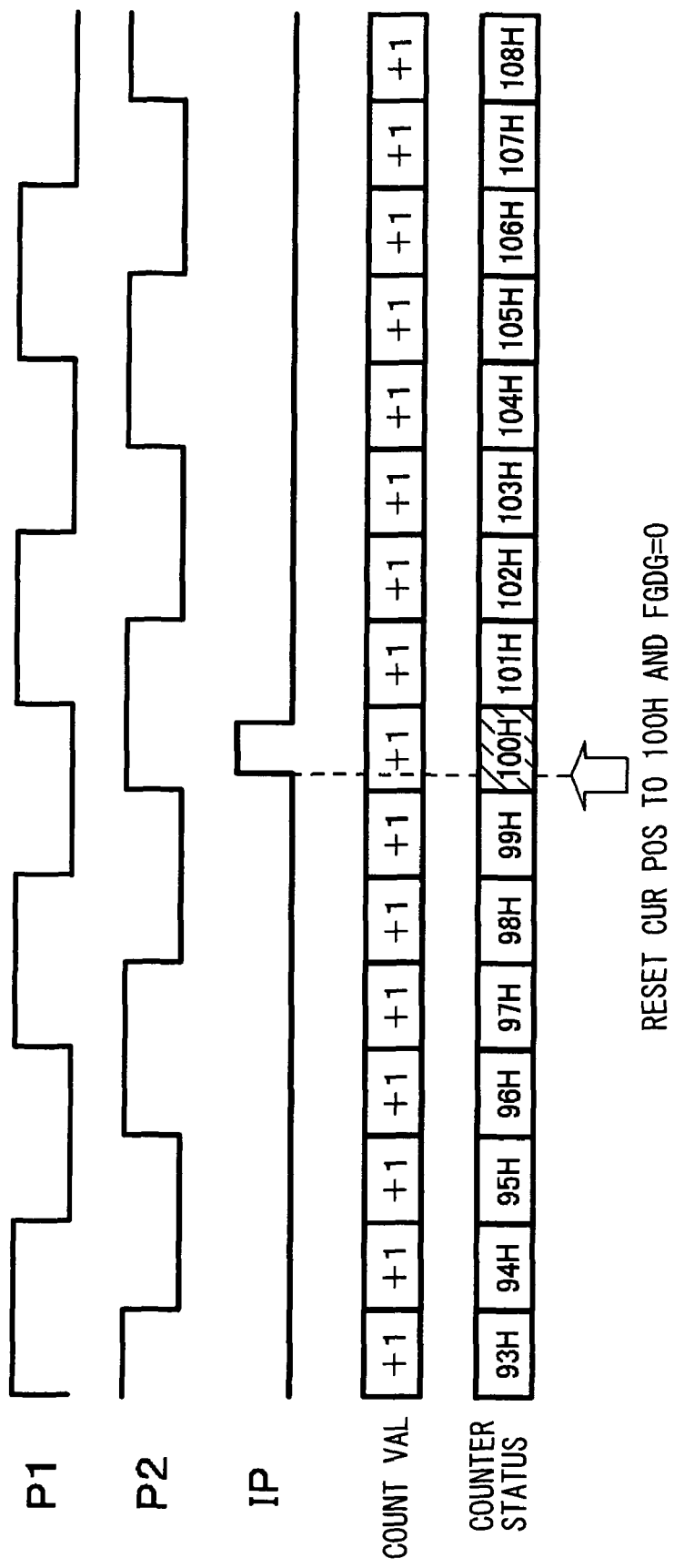
FIG. 19 is a timing chart showing operation in a normal mode of the servomotor unit with passing through the original point and without a rotation position shift in case of normal rotation.

In the present embodiment, the pulse encoder provides the original point detection element. Alternatively, the original point detection element may be an original point sensor, which is independent from the pulse encoder. FIG. 14 shows a servomotor unit 4 with an original point detection switch 11, which provides the original point sensor. Specifically, the logic circuit 9 is electrically coupled with the switch 11. FIG. 15 shows the pulse input waveform P1 of the rotation pulse corresponding to the first slit row, the pulse input waveform P2 of the rotation pulse corresponding to the second slit row, and a signal IP showing the original point detection signal from the switch 11. Specifically, FIG. 15 shows the original point detection operation in the initialization mode of the servomotor unit 4 in case of motor normal rotation and INT=1.FIG. 16 shows the pulse input waveform P1 of the rotation pulse corresponding to the first slit row, the pulse input waveform P2 of the rotation pulse corresponding to the second slit row; and a signal IP showing the original point detection signal from the switch 11. Specifically, FIG. 16 shows the original point detection operation in the initialization mode of the servomotor unit 4 in case of motor reverse rotation and INT=1.In FIGS. 15 and 16, the pulse encoder 8 does not include a generating element for generating the original point waveform pattern, and therefore, only the normal waveform pattern is output. Instead, the switching status of the original point detection switch 11 is detected, so that the signal IP is output. When the switch 11 detects the original point, the counter status is reset to the original point value of 100H. Further, the unit 4 stops driving the motor 5. FIG. 17 shows the current rotation position reset operation in the normal mode of the servomotor unit with passing through the original point and with a rotation position shift in case of motor normal rotation and INT=0.FIG. 18 shows the current rotation position reset operation in the normal mode of the servomotor unit with passing through the original point and with the rotation position shift in case of reverse rotation and INT=0.FIG. 19 shows the current rotation position reset operation in the normal mode of the servomotor unit with passing through the original point and without a rotation position shift in case of normal rotation and INT=0.FIG. 20 shows the current rotation position reset operation in the normal mode of the servomotor unit with passing through the original point and without the rotation position shift in case of reverse rotation and INT=0.In FIGS. 17-20, the unit 4 detects the signal IP showing the original point detection signal from the switch 11. Thus, the current position counter status is reset to the original point value (i.e., 100H). The unit 4 receives a command of "INT=0" showing the normal mode from the integrated control unit 2, so that the motor does not stop driving.

The above disclosure has the following aspects.

According to a first aspect of the present disclosure, a servomotor control system includes: an integrated control unit for integrally controlling a plurality of servomotors; and a plurality of servomotor units, each of which is coupled with the integrated control unit via a communication network, and coupled with a corresponding servomotor. Each servomotor unit includes: a motor driver for driving the servomotor; a rotation detector for detecting rotation of the servomotor; an original point detector for detecting an original point of the servomotor; a communication element for obtaining control information including rotation position instruction information from the integrated control unit; a rotation position calculator for obtaining a rotation detection signal from the rotation detector and for calculating a current rotation position of the servomotor based on the rotation detection signal; a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point when the original point detector detects the original point.

In the above servomotor control system, when the original point detector detects the original point, the current rotation position correction element resets the current rotation position to be a predetermined original point, which is preliminary stored in the servomotor unit without receiving the correct current rotation position information from the integrated control unit. Thus, the servomotor unit executes all of correction processes from an original point detection step to a current rotation position resetting process. Thus, a communication dead time for obtaining the correct current rotation position information from the integrated control unit does not occur. Accordingly, even if the motor position is displaced by external force or the like during the dead time as a waiting time, the current rotation position is correctly reset since the system does not have the dead time. Further, since it is not necessary to obtain the correct current rotation position information from the integrated control unit, a communication sequence for motor control is simplified.

Alternatively, the rotation detector may be an increment type pulse encoder, which rotates in synchronization with a rotation axis of the servomotor. The rotation position calculator includes a pulse counter for counting a rotation pulse, which is output from the pulse encoder. The current rotation position correction element resets a counter status of the pulse counter to be a original point status when the original point detector detects the original point, and the counter status corresponds to the current rotation position, and the original point status corresponds to the predetermined original point. In this case, the current rotation position correction element may be a counter reset element for resetting the pulse counter status to a predetermined original point counter status when the original point detection element detects the original point. The pulse counter may be a logic circuit including a counter IC. Alternatively, the pulse counter may be provided by a soft ware counter, which is performed by a micro computer. When the pulse counter is a logic circuit including a counter IC, an original point detection signal from the original point detection element may be input into a reset terminal of the counter IC. The counter IC is, in general, a bit counter having a combination of flip-flop circuits. A reset input signal is input into a reset terminal of each flip-flop circuit, which provides a counter memory. An output value of the flip-flop circuit in case of a reset step is logically and preliminary determined. Thus, an output value of the counter IC after the reset step, which is a counter status corresponding to the original point, is preliminary stored in the servomotor unit, specifically, in the counter IC. Alternatively, the servomotor unit may include a preset circuit, which is disposed in the counter IC or around the counter IC. The preset circuit presets the predetermined original counter status in a counter memory when the preset circuit receives the original point detection signal. When the pulse counter is provided by the micro computer, a counter status of a soft ware counter may be reset, or a predetermined memory value corresponding to the original point may be set. These soft ware steps are executed in a routine of a counter program.

Alternatively, the pulse encoder may include first and second rotation pulse waveform generators, which provide two channels. Each of the first and second rotation pulse waveform generators has an advance angle relationship of a phase of the rotation detection signal. The advance angle relationship is reversed according to a rotation direction of the motor. Each of the first and second rotation pulse generators outputs a normal waveform pattern and a specific original point waveform pattern. Each of the first and second rotation pulse generators outputs the specific original point waveform pattern when the servomotor reaches the original point. The specific original point waveform pattern is distinguishable from the normal waveform pattern. The original point detector monitors first and second rotation detection signals output from the first and second rotation pulse waveform generators. The original point detector detects the original point when original point detector detects the original point waveform pattern in the first and second rotation detection signals. In this case, the original point detection element is incorporated in the pulse encoder. Accordingly, the number of parts of the servomotor unit is reduced, and therefore, the manufacturing steps of the system are reduced.

Alternatively, the original point detector may be an original point sensor for detecting the original point of the servomotor and for outputting an original point detection signal, and the original point sensor is independent from the pulse encoder. In this case, although it is necessary to prepare the original point sensor, it is not necessary to incorporate a logic circuit for detecting the original point in the pulse encoder. Thus, the manufacturing cost of the pulse encoder is reduced. In each of a case where the original point detection element is provided by the pulse encoder and a case where the original point detection element is provided by the original point sensor, it is preferred that a hard ware structure such as the pulse encoder and the original point sensor is directly connected to the servomotor unit (specifically, to the current rotation position correction element). Thus, the original point detection signal is directly input into the rotation position calculator. This is because the reset process of the current rotation position to the original point is completed in the servomotor unit.

Alternatively, the integrated control unit may select one of a normal mode and an initialization mode as an operation mode of the servomotor. The motor drive instruction element outputs a drive stop instruction to the motor driver when the current rotation position correction element resets the current rotation position in a case where the integrated control unit selects the initialization mode, and the motor drive instruction element does not output the drive stop instruction to the motor driver when the current rotation position correction element resets the current rotation position in a case where the integrated control unit selects the normal mode. The reset process of the current rotation position to the original point may be the initialization process when the system starts to operate, for example, when a vehicle starts to drive in case of an in-vehicle servomotor control system. The integrated control unit detects a system start signal, for example, an ignition signal of the vehicle. Then, the integrated control unit transmits the servomotor unit initialization instruction to each servomotor unit. Then, the servomotor unit executes the initialization operation for detecting the original point. When the original point is detected, the current rotation position status is reset to the original point status. Here, the initialization operation for detecting the original point may be performed such that the integrated control unit transmits the information about initialization operation sequence to the servomotor unit. For example, a certain rotation direction, to which the original point exists, is preliminary and tentatively determined. Further, the integrated control unit sends a communication instruction to the servomotor unit, the instruction indicating the initialization operation for detecting the original pint together with a tentative target position in the tentative rotation direction. The servomotor unit includes a logic circuit or a soft ware for providing the initialization operation sequence, and the integrated control unit sends only a trigger instruction to the servomotor unit. Alternatively, the motor drive instruction element may output the drive stop instruction to the motor driver when the current rotation position correction element resets the current rotation position in case of the initialization operation. Thus, the motor stops driving when the current rotation position is reset to the original point. Here, a motor position when the system has stopped operating previously may be stored in a memory. When the system starts to operate, the motor position in the memory is preset as an initial motor position. In this case, the motor may drive to rotate at an initial motor position, which is preset, and then, the motor stops driving at the initial motor position when the original point reset operation is performed. In the above system, the integrated control unit can select the normal mode and the initialization mode. In this case, in a case where the initialization mode is selected, the motor drive instruction element outputs a drive stop instruction to the motor driver when the current rotation position correction element resets the current rotation position. In a case where the normal mode is selected, the drive stop instruction is not output even when the current rotation position correction element resets the current rotation position. Thus, in an ordinary operation, when the motor passes through the original point, the current rotation position is reset to the original point. The rotation position shift is corrected as needed.

Alternatively, each servomotor unit may further include a rotation position shift occurrence notification element. The rotation position shift occurrence notification element compares the counter status of the pulse counter before resetting the current rotation position with the counter status of the pulse counter after resetting the current rotation position, and the rotation position shift occurrence notification element notifies rotation position shift occurrence information to the integrated control unit when a comparison result of the counter status indicates a rotation position shift. It is preferable to notify the rotation position shift occurrence information to the integrated control unit in view of smooth integration of control.

According to a second aspect of the present disclosure, a servomotor unit connectable to a communication network includes: a motor driver for driving a servomotor; a rotation detector for detecting rotation of the servomotor; an original point detector for detecting an original point of the servomotor; a communication element for obtaining control information including rotation position instruction information from an external integrated control unit via the communication network; a rotation position calculator for obtaining a rotation detection signal from the rotation detector and for calculating a current rotation position of the servomotor based on the rotation detection signal; a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point when the original point detector detects the original point.

In the above servomotor unit, when the original point detector detects the original point, the current rotation position correction element resets the current rotation position to be a predetermined original point, which is preliminary stored in the servomotor unit without receiving the correct current rotation position information from the integrated control unit. Thus, the servomotor unit executes all of correction processes from an original point detection step to a current rotation position resetting process. Thus, a communication dead time for obtaining the correct current rotation position information from the integrated control unit does not occur. Accordingly, even if the motor position is displaced by external force or the like during the dead time as a waiting time, the current rotation position is correctly reset since the system does not have the dead time. Further, since it is not necessary to obtain the correct current rotation position information from the integrated control unit, a communication sequence for motor control is simplified.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A servomotor control system comprising:
an integrated control unit for integrally controlling a plurality of servomotors; and
a plurality of servomotor units, each of which is coupled with the integrated control unit via a communication network, and coupled with a corresponding servomotor,
wherein each servomotor unit includes:
a motor driver for driving the servomotor;
a rotation detector for detecting rotation of the servomotor;
an original point detector for detecting an original point of the servomotor;
a communication element for obtaining control information including rotation position instruction information from the integrated control unit;
a rotation position calculator for obtaining a rotation detection signal from the rotation detector and for calculating a current rotation position of the servomotor based on the rotation detection signal;
a motor drive instruction element for obtaining the control information from the communication element and for outputting driving instruction information to the motor driver according to the control information including the rotation position instruction information and the current rotation position; and
a current rotation position correction element for resetting the current rotation position calculated by the rotation position calculator to be a predetermined original point without using the control information when the original point detector detects the original point;
wherein the integrated control unit selects one of a normal mode and an initialization mode as an operation mode of the servomotor,
wherein the motor drive instruction element outputs a drive stop instruction to the motor driver when the current rotation position correction element resets the current rotation position in a case where the integrated control unit selects the initialization mode, and
wherein the motor drive instruction element does not output the drive stop instruction to the motor driver so that the servomotor continues to rotate, and the current rotation position correction element resets the current rotation position to be the predetermined original point when the original point detector detects the original point, in a case where the current rotation position correction element resets the current rotation position, and the integrated control unit selects the normal mode.

2. The system according to claim 1,
wherein the rotation detector is an increment type pulse encoder, which rotates in synchronization with a rotation axis of the servomotor,
wherein the rotation position calculator includes a pulse counter for counting a rotation pulse, which is output from the pulse encoder,
wherein the current rotation position correction element resets a counter status of the pulse counter to be a original point status when the original point detector detects the original point, and
wherein the counter status corresponds to the current rotation position, and the original point status corresponds to the predetermined original point.

3. The system according to claim 2,
wherein the pulse encoder includes first and second rotation pulse waveform generators, which provide two channels,
wherein each of the first and second rotation pulse waveform generators has an advance angle relationship of a phase of the rotation detection signal,
wherein the advance angle relationship is reversed according to a rotation direction of the servomotor,
wherein each of the first and second rotation pulse generators outputs a normal waveform pattern and a specific original point waveform pattern,
wherein each of the first and second rotation pulse generators outputs the specific original point waveform pattern when the servomotor reaches the original point,
wherein the specific original point waveform pattern is distinguishable from the normal waveform pattern,
wherein the original point detector monitors first and second rotation detection signals output from the first and second rotation pulse waveform generators, and
wherein the original point detector detects the original point when original point detector detects the original point waveform pattern in the first and second rotation detection signals.

4. The system according to claim 2,
wherein the original point detector is an original point sensor for detecting the original point of the servomotor and for outputting an original point detection signal, and
wherein the original point sensor is independent from the pulse encoder.

5. The system according to claim 2,
wherein each servomotor unit further includes a rotation position shift occurrence notification element,
wherein the rotation position shift occurrence notification element compares the counter status of the pulse counter before resetting the current rotation position with the counter status of the pulse counter after resetting the current rotation position, and
wherein the rotation position shift occurrence notification element notifies rotation position shift occurrence information to the integrated control unit when a comparison result of the counter status indicates a rotation position shift.

6. A servomotor unit connectable to a communication network comprising:
a motor driver for driving a servomotor;
a rotation detector for detecting rotation of the servomotor;
an original point detector for detecting an original point of the servomotor;
a communication element for obtaining control information including rotation position instruction information from an external integrated control unit via the communication network;
a rotation position calculator for obtaining a rotation detection signal from the rotation detector and for calculating a current rotation position of the servomotor based on the rotation detection signal;

a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point without using the control information when the original point detector detects the original point, wherein the integrated control unit selects one of a normal mode and an initialization mode as an operation mode of the servomotor, wherein the motor drive instruction element outputs a drive stop instruction to the motor driver when the current rotation position correction element resets the current rotation position in a case where the integrated control unit selects the initialization mode, and wherein the motor drive instruction element does not output the drive stop instruction to the motor driver so that the servomotor continues to rotate, and the current rotation position correction element resets the current rotation position to be the predetermined original point when the original point detector detects the original point, in a case where the current rotation position correction element resets the current rotation position, and the integrated control unit selects the normal mode.

7. A servomotor control system comprising:

an integrated control unit for integrally controlling a plurality of servomotors; and a plurality of servomotor units, each of which is coupled with the integrated control unit via a communication network, and coupled with a corresponding servomotor, wherein each servomotor unit includes:

a motor driver for driving the servomotor;

a rotation detector for detecting rotation of the servomotor;

an original point detector for detecting an original point of the servomotor;

a communication element for obtaining control information including rotation position instruction information from the integrated control unit;

a rotation position calculator for obtaining a rotation detection signal from the rotation detector and for calculating a current rotation position of the servomotor based on the rotation detection signal;

a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point when the original point detector detects the original point;

wherein the rotation detector is an increment type pulse encoder, which rotates in synchronization with a rotation axis of the servomotor;

wherein the rotation position calculator includes a pulse counter for counting a rotation pulse, which is output from the pulse encoder;

wherein the current rotation position correction element resets a counter status of the pulse counter to be a original point status when the original point detector detects the original point;

wherein the counter status corresponds to the current rotation position, and the original point status corresponds to the predetermined original point;

wherein the pulse encoder includes first and second rotation pulse waveform generators, which provide two channels;

wherein each of the first and second rotation pulse waveform generators has an advance angle relationship of a phase of the rotation detection signal;

wherein the advance angle relationship is reversed according to a rotation direction of the servomotor;

wherein each of the first and second rotation pulse generators outputs a normal waveform pattern and a specific original point waveform pattern;

wherein each of the first and second rotation pulse generators outputs the specific original point waveform pattern when the servomotor reaches the original point;

wherein the specific original point waveform pattern is distinguishable from the normal waveform pattern;

wherein the original point detector monitors first and second rotation detection signals output from the first and second rotation pulse waveform generators; and wherein the original point detector detects the original point when original point detector detects the original point waveform pattern in the first and second rotation detection signals.

8. The system according to claim 7, wherein the original point detector is an original point sensor for detecting the original point of the servomotor and for outputting an original point detection signal, and wherein the original point sensor is independent from the pulse encoder.

9. The system according to claim 7, wherein each servomotor unit further includes a rotation position shift occurrence notification element, wherein the rotation position shift occurrence notification element compares the counter status of the pulse counter before resetting the current rotation position with the counter status of the pulse counter after resetting the current rotation position, and wherein the rotation position shift occurrence notification element notifies rotation position shift occurrence information to the integrated control unit when a comparison result of the counter status indicates a rotation position shift.

10. A servomotor control system comprising:

an integrated control unit for integrally controlling a plurality of servomotors; and a plurality of servomotor units, each of which is coupled with the integrated control unit via a communication network, and coupled with a corresponding servomotor, wherein each servomotor unit includes:

a motor driver for driving the servomotor;

a rotation detector for detecting rotation of the servomotor;

an original point detector for detecting an original point of the servomotor;

a communication element for obtaining control information including rotation position instruction information from the integrated control unit;

a rotation position calculator for obtaining a rotation detection signal from the rotation detector and for calculating a current rotation position of the servomotor based on the rotation detection signal;

a motor drive instruction element for obtaining the control information from the communication element and for outputting driving instruction information to the motor driver according to the control information including the rotation position instruction information and the current rotation position; and a current rotation position correction element for resetting the current rotation position calculated by the rotation position calculator to be a predetermined original point when the original point detector detects the original point, wherein the integrated control unit selects one of a normal mode and an initialization mode as an operation mode of the servomotor, wherein the motor drive instruction element outputs a drive stop instruction to the motor driver when the current rotation position correction element resets the current rotation position in a case where the integrated control unit selects the initialization mode, and wherein the motor drive instruction element does not output the drive stop instruction to the motor driver when the current rotation position correction element resets the current rotation position in a case where the integrated control unit selects the normal mode.

* * * * *